United States Patent
Kweon et al.

(10) Patent No.: US 9,794,368 B2
(45) Date of Patent: Oct. 17, 2017

(54) APPARATUS AND METHOD FOR MANAGING SUBSCRIBER PROFILE IN WIRELESS COMMUNICATION SYSTEM

(71) Applicant: Samsung Electronics Co., Ltd., Gyeonggi-do (KR)

(72) Inventors: Kisuk Kweon, Gyeonggi-do (KR); Beomsik Bae, Gyeonggi-do (KR); Hanna Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/996,130

(22) Filed: Jan. 14, 2016

(65) Prior Publication Data

US 2016/0205538 A1    Jul. 14, 2016

(30) Foreign Application Priority Data

Jan. 14, 2015  (KR) .......................... 10-2015-0006846

(51) Int. Cl.
| | |
|---|---|
| *H04M 3/42* | (2006.01) |
| *H04L 29/08* | (2006.01) |
| *H04W 8/20* | (2009.01) |
| *H04W 4/00* | (2009.01) |
| *H04W 4/02* | (2009.01) |

(52) U.S. Cl.
CPC ........... *H04L 67/306* (2013.01); *H04W 4/001* (2013.01); *H04W 8/205* (2013.01); *H04W 4/021* (2013.01)

(58) Field of Classification Search
CPC ............. H04M 15/06; H04M 15/7652; H04M 15/7655; H04M 2215/7245; H04M 2215/725; H04M 3/42153; H04W 8/18

USPC .................. 379/142.01; 455/414.01
See application file for complete search history.

(56) References Cited

U.S. PATENT DOCUMENTS

| | | |
|---|---|---|
| 7,912,464 B2 | 3/2011 | Jiang |
| 2007/0189476 A1 | 8/2007 | Marsico et al. |
| 2007/0213075 A1 | 9/2007 | Jiang |
| 2012/0208463 A1 | 8/2012 | Causey et al. |
| 2013/0103946 A1 | 4/2013 | Binenstock |
| 2013/0260761 A1 | 10/2013 | Walke et al. |

(Continued)

OTHER PUBLICATIONS

International Search Report dated Apr. 26, 2016 in connection with International Application No. PCT/KR2016/000330, 3 pages.

(Continued)

*Primary Examiner* — Charles Shedrick

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Subscriber profile management in a wireless communication system is disclosed. A method for operating a user device, the method comprises: determining a state change of a direct connection with another device; and controlling a state of a profile including the same subscriber identification number as a subscriber identification number assigned to the other device, according to the state change of the direct connection.

20 Claims, 22 Drawing Sheets

(56) References Cited

U.S. PATENT DOCUMENTS

2014/0123232 A1 5/2014 Kuscher et al.
2014/0162622 A1 6/2014 Oda et al.

OTHER PUBLICATIONS

Written Opinion of the International Searching Authority dated Apr. 26, 2016 in connection with International Application No. PCT/KR2016/000330, 5 pages.

⟷ : CELLULAR CONNECTION
⟵--⟶ : DIRECT CONNECTION

APPARATUS AND METHOD FOR MANAGING SUBSCRIBER PROFILE IN WIRELESS COMMUNICATION SYSTEM

CROSS-REFERENCE TO RELATED APPLICATIONS AND CLAIM OF PRIORITY

The present application is related to and claims benefit under 35 U.S.C. §119(a) to a Korean patent application filed in the Korean Intellectual Property Office on Jan. 14, 2015, and assigned Serial No. 10-2015-0006846, the entire disclosure of which is hereby incorporated by reference.

TECHNICAL FIELD

The present disclosure relates generally to subscriber profile management in a wireless communication system.

BACKGROUND

To meet the demand for wireless data traffic having increased since deployment of 4G (4$^{th}$ generation) communication systems, efforts have been made to develop an improved 5G (5$^{th}$ generation) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Before a mobile telephone system is developed, a phone call was made through a public telephone network such as public switched telephone network (PSTN) connected by wire. Since then, a mobile communication system is developed with advances of mobile communication technology. Further, advances of manufacturing technology lead to plentiful supply of portable communication devices such as smart phones, and thus every person possesses his/her own telephone number.

In recent, to meet users' various demands, various communication devices are developed and widely used. For example, in addition to the smart phone advanced from the existing portable phone, a large-screen portable electronic device and a wearable device put on a body are under development. Accordingly, one user can own a plurality of communication devices. However, a current communication system is developed based on a single phone number per device. As a result, even when a user has a plurality of devices, different phone numbers are assigned to the devices respectively. In this case, the user needs to manage the multiple phone numbers and may suffer from confusion in the phone number management.

SUMMARY

To address the above-discussed deficiencies, it is a primary object to provide an apparatus and a method for managing a phone number in a wireless communication system.

Another aspect of the present disclosure is to provide an apparatus and a method for assigning a common phone number to a plurality of devices in a wireless communication system.

Yet another aspect of the present disclosure is to provide an apparatus and a method for accessing a network from a plurality of devices using the same phone number in a wireless communication system.

Still another aspect of the present disclosure is to provide an apparatus and a method for controlling a state of a profile installed on a user device in a wireless communication system.

A further aspect of the present disclosure is to provide an apparatus and a method for controlling a state of a profile based on a connection state between devices assigned the same phone number in a wireless communication system.

According to one aspect of the present disclosure, a method for operating a user device in a wireless communication system includes determining a state change of a direct connection with another device, and controlling a state of a profile comprising the same subscriber identification number as a subscriber identification number assigned to the other device, according to the state change of the direct connection.

According to another aspect of the present disclosure, a method for operating a server which manages a subscriber profile in a wireless communication system includes receiving a first message for triggering to change a state of a profile installed in one of user devices which use the same subscriber identification number, and sending a second message requesting the profile state change to the device indicated by the first message.

According to yet another aspect of the present disclosure, an apparatus of a user device in a wireless communication system includes a subscriber information module (e.g., SIM) for storing a profile, and a controller for determining a state change of a direct connection with another device, and controlling a state of the profile comprising the same subscriber identification number as a subscriber identification number assigned to the other device, according to the state change of the direct connection.

According to still another aspect of the present disclosure, an apparatus of a server which manages a subscriber profile in a wireless communication system includes a transceiver for receiving a first message for triggering to change a state of a profile installed in one of user devices which use the same subscriber identification number, and a transceiver for sending a second message requesting the profile state change to the device indicated by the first message.

Other aspects, advantages, and salient features of the disclosure will become apparent to those skilled in the art from the following detailed description, which, taken in conjunction with the annexed drawings, discloses exemplary embodiments of the disclosure. Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present disclosure will be more apparent from the following description taken in conjunction with the accompanying drawings, in which: For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1A:
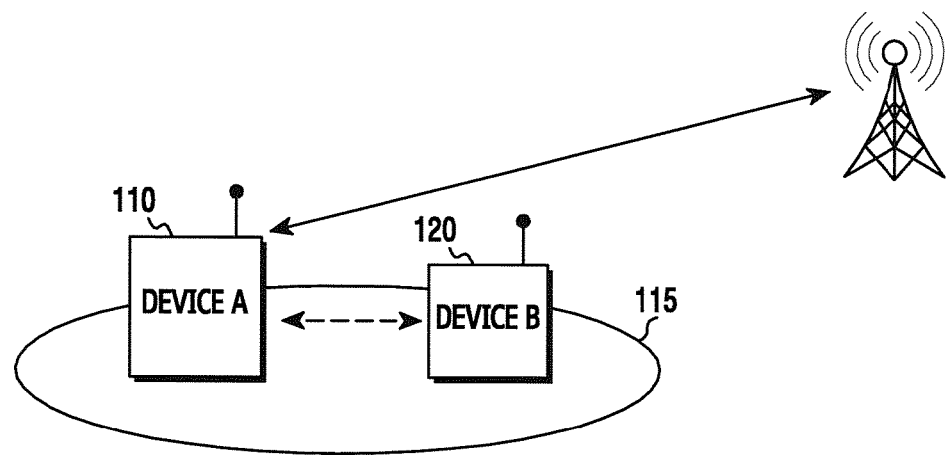
FIG. 1A and FIG. 1B illustrates a cellular network connection path in a wireless communication system according to an embodiment of the present disclosure.

FIGS. 1A through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for managing a subscriber identification number in a user device in a wireless communication system. The subscriber identification number is an identification number for routing a call, and can be referred to as a phone number, a Mobile Station International Subscriber Directory Number (MSISDN), and the like.

Hereafter, terms indicating modules relating to subscriber information, terms indicating information items in the modules, terms indicating network entities, and terms indicating information items exchanged between the network entities are illustrated by way of example. Accordingly, the present disclosure is not limited to those terms to be explained, and can adopt other equivalent terms.

Terms such as "~part" and "~unit" indicate a unit for processing at least one function or operation, and can be realized using hardware, software, or a combination of the hardware and the software.

Figure 1B:
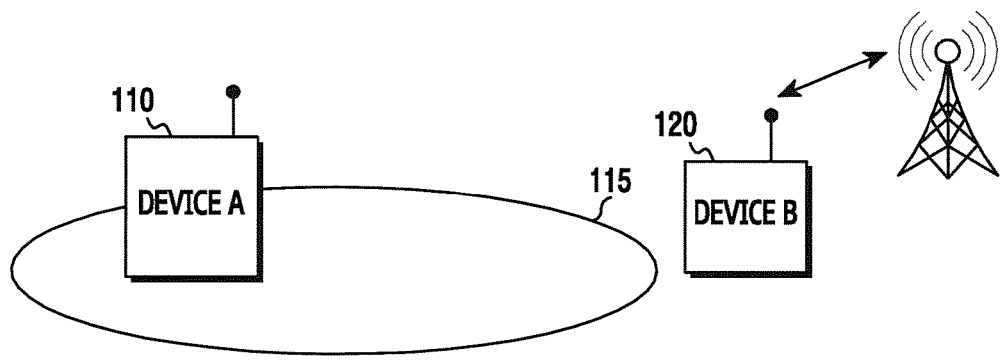

FIG. 1A and FIG. 1B depicts a cellular network connection path in a wireless communication system according to an embodiment of the present disclosure. In FIG. 1A and FIG. 1B, when one user possesses two devices, that is, a device A 110 and a device B 120, a cellular network connection path of the device B 120 is depicted.

In FIG. 1A and FIG. 1B, the device A 110 and the device B 120 can be of the same or different types. For example, the device A 110 can include, as a portable electronic device, one of a smart phone, a portable terminal, a mobile phone, a mobile pad, a media player, a tablet computer, a handheld computer, and a Personal Digital Assistant (PDA), or a combination of two or more of these devices. The device B 120 can include, as a wearable device, a watch, glasses, a necklace, and a headset.

In FIG. 1A, the device B 120 is at a distance allowing direct communication with the device A 110. Referring to FIG. 1A, the device A 110 can directly access a cellular network. The device B 120 is in a range 115 allowing the direct connection with the device A 110. Hence, the device B 120 can establish direct connection with the device A 110. For example, the direct connection can be built based on various communication techniques such as Bluetooth, wireless Local Area Network (LAN), and Zigbee. Thus, the device B 120 can indirectly access the cellular network via the device A 110.

In FIG. 1B, the device B 120 leaves the range 115 allowing the direct communication with the device A 110. Referring to FIG. 1B, the device B 120 can directly access the cellular network without the aid of the device A 110. That is, the device B 120 includes a transceiver for accessing the cellular network, and can independently access the cellular network. In various embodiments of the present disclosure to be explained, the device A 110 and the device B 120 can select a device for accessing the cellular network.

Although not depicted in FIG. 1A and FIG. 1B, the device B 120 even at the direct communication distance from the device A 110, can directly access the cellular network. In this case, the device A 110 can release its cellular network connection, and the device B 120 can access the cellular network.

As such, the device B 120 can directly access the cellular network. For doing so, the device B 120 includes the transceiver for accessing the cellular network, and a subscriber information module for recording subscriber information and authentication information. The subscriber information module can be referred to as a subscriber information module (SIM), a universal integrated circuit card (UICC), an embedded UICC (eUICC), and so on. The subscriber information module of the device B 120 is shown in FIG. 2.

Figure 2:
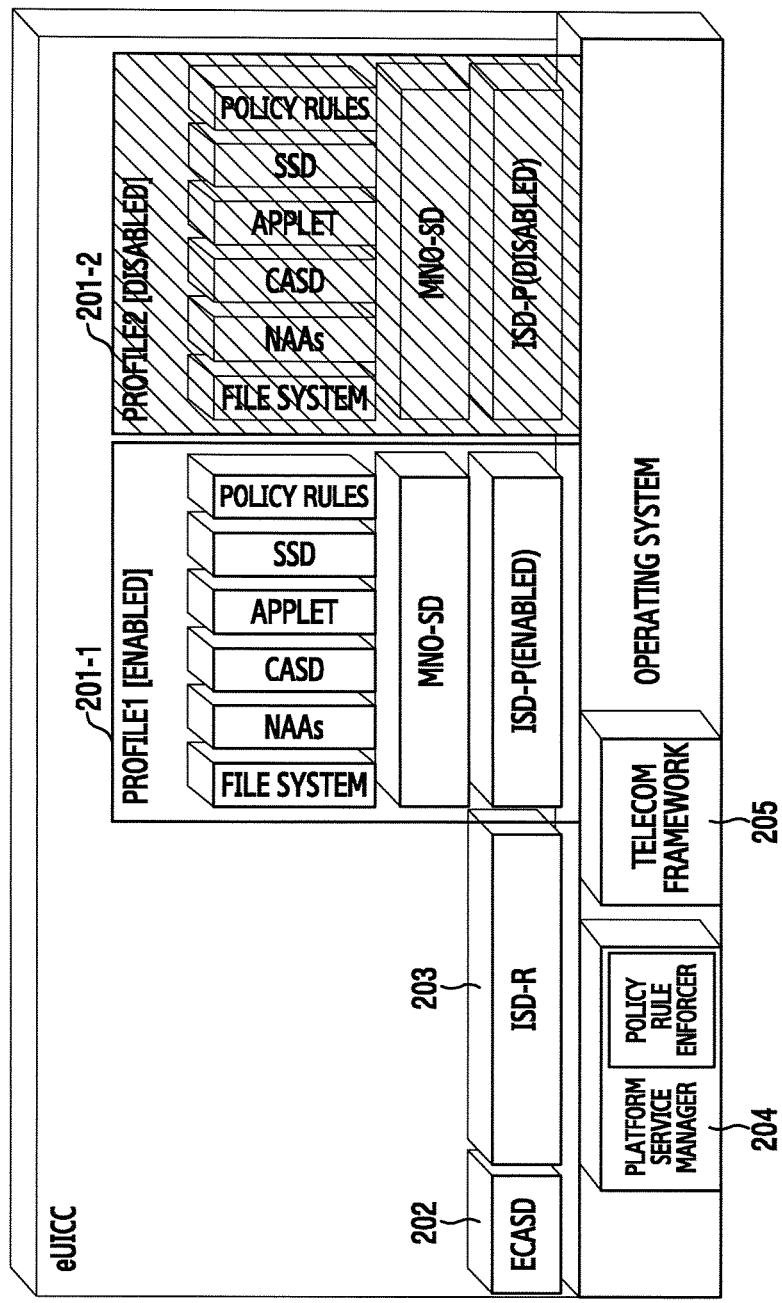
FIG. 2 illustrates a subscriber information module installed to a device in a wireless communication system according to an embodiment of the present disclosure.

FIG. 2 depicts a subscriber information module installed to a device in a wireless communication system according to an embodiment of the present disclosure. FIG. 2 shows the eUICC.

Referring to FIG. 2, the subscriber information module includes a profile1 201-1, a profile2 201-2, an eUICC certificate authority security domain (ECASD) 202, an issuer security domain root (ISD-R) 203, a platform service manager 204, and a telecommunication (telecom) framework 205. The platform service manager 204 and the telecom framework 205 configure an operating system.

The profile1 201-1 and the profile2 201-2 are a set of subscriber information required to access a cellular network. The profile1 201-1 and the profile2 201-2 correspond to different network providers respectively. Accordingly, one of the profile1 201-1 and the profile2 201-2 is enabled, and the other is disabled. In FIG. 2, the profile2 201-2 is disabled. The profile1 201-1 and the profile2 201-2 each can include at least one of a file system, a network access application (NAA), controlling authority security domain (CASD), applet, supplementary security domain (SSD), policy rules, mobile network operator security domain (MNO-SD), and issuer security domain profile (ISD-P).

The ISD-P is a representative of the subscriber information module for the corresponding MNO. The ISD-P is a separate and independent entity on the subscriber information module, and can include a profile including the file system, the NAA, and the policy rules. The ISD-P can include a state machine for creating, enabling, and disabling the profile, and a key for profile management. The MNO-SD includes an over the air (OTA) key of the corresponding MNO, and provides a secure OTA channel.

The ECASD 202 is created when the subscriber information module is manufactured. The ECASD 202 can include a non-modifiable private key, an associated certificate, a root public key of a certificate issuer (IC), and an eUICC manufacturer (EUM) key set. The ECASD 202 can establish a new keyset for the ISD-P and the ISD-R 203.

The ISD-R 203 serves as a representative of the subscriber information module for a subscription manager secure routing (SM-SR) server. The ISD-R 203 is associated to the SM-SR server and provides a secure OTA channel. The ISD-R 203 offers a service of a transport part during profile downloading. The ISD-R 203 can execute platform management according to the policy rules.

The platform service manager 204 is an operating system service, offers platform management functions, and includes a policy rules enforcer for enforcing the policy rules. When called by the ISD-R 203 or the ISD-P, the platform service manager 204 can execute functions according to the policy rules.

The telecom framework 205 is an operating system service and can provide a standardized network authentication algorithm to the NAA. In addition, the telecom framework 205 can provide a capability for configuring the algorithm with needed parameters.

So far, the subscriber information module of the device has been explained by referring to FIG. 2. It is noted that the present disclosure is not limited to the subscriber information module of FIG. 2, and the present device can employ a subscriber information module including components of a different structure or different names from those of FIG. 2.

Figure 3:
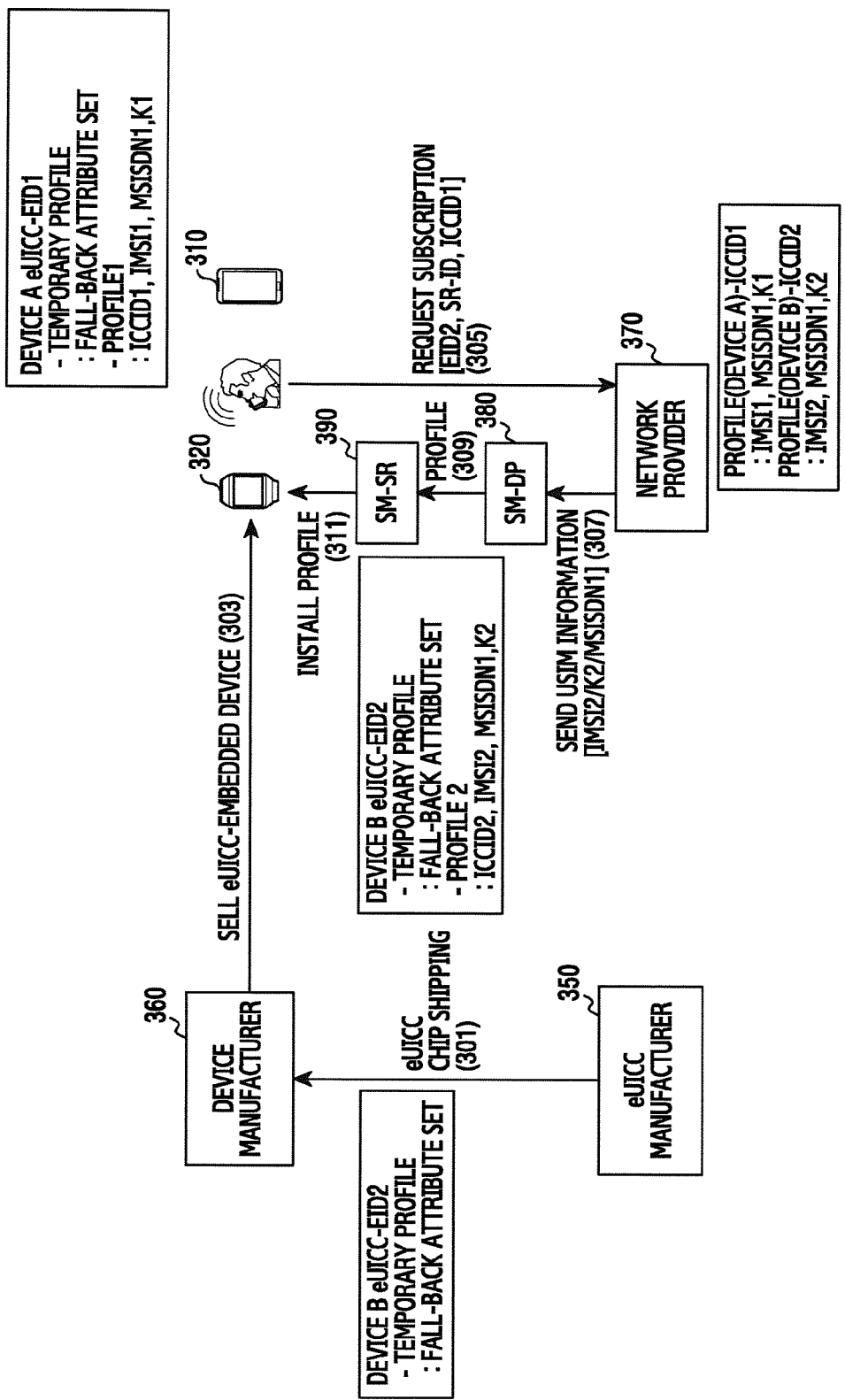
FIG. 3 illustrates subscriber profile installation in a wireless communication system according to an embodiment of the present disclosure.

FIG. 3 depicts subscriber profile installation in a wireless communication system according to an embodiment of the present disclosure. In FIG. 3, a user possesses a device A 310 and a device B 320, a profile is installed in the device A 310, and a subscriber information module of the device B 320 is an eUICC.

Referring to FIG. 3, in operation 301, an eUICC manufacturer 350 ships an eUICC chip to a device manufacturer 360. The eUICC is an embedded subscriber information module, and is attached when the device is manufactured. Once the manufacturing of the device is finished, the eUICC is not detached without dissembling the device. The eUICC chip has an eUICC Identifier (EID)2 as its own identification information, and includes a fall-back attribute set as a provisioning profile.

In operation 303, the device manufacturer 360 sells the device B 320 including the eUICC chip therein, to a user. That is, the device manufacturer 360 manufactures and sells the device B 320 including the eUICC chip. Hence, the user can possess the device B 320. The operation 303 can be conducted offline.

In operation 305, the user submits subscription for the device B 320 to a network provider 370. In the subscription, the EID2 of the subscriber information module, that is, the eUICC of the device B 320, subscription manager identifier (SR-ID) corresponding to the eUICC, and integrated circuit card identifier (ICCID)1 are provided. The SR-ID is an ID of an SM-SR server 390 to access in the profile installation of the device B 320. The ICCID1 is identification information of the profile of the device A 310 of the user. The operation 305 can be conducted offline.

In operation 307, the network provider 370 provides universal subscriber identity module (USIM) information to a subscriber manager data preparation (SM-DP) server 380. The USIM information can include international mobile subscriber identity (IMSI) for identifying the user, key (K) for authentication, and MSISDN which is a phone number. In FIG. 3, the USIM information provided for the device B 320 includes IMSI2, K2, and MSISDN1. Herein, the IMSI2 and the K2 have different values from IMSI (e.g., IMSI1) and K (e.g., K1) of the device A 310. Still, the MSISDN1 is the same as MSISDN (e.g., MSISDN1) of the device A 310. That is, the network provider 370 retrieves the MSISDN of the device A 310 using the ICCID1 received with the subscription, and assigns the same MSISDN1 to the device B 320. Thus, the profile of the device A 310 includes the IMSI1, the MSISDN1, and the K1, and the profile of the device B 320 includes the IMSI2, the MSISDN1, and the K2.

In operation 309, the SM-DP server 380 packages the profile based on the USIM information and provides the profile to the SM-SR server 390. In so doing, the SM-DP server 380 can encrypt the profile. That is, the SM-DP server 380 creates a personalized profile of a specific device, that is, the device B 320 based on the information received from the network provider 370, and provides the profile to the SM-SR server 390.

In operation 311, the SM-SR server 390 provides the profile to the device B 320, and the device B 320 installs the profile. The profile is forwarded to the device B 320 through wireless communication. Since the profile is not yet installed in the device B 320, the device B 320 cannot communicate via a network of the network provider 370. Accordingly, the device B 320 can temporarily access the network using the temporary profile and receive the profile from the SM-SR server 390. The network accessible with the temporary profile can be the network of the network provider 370, or a different network.

As such, the device B 320 can use the same MSISDN, that is, the same subscriber identification number as the device A 310. In other words, the same phone number can be assigned to the device A 310 and the device B 320. Thus, the network provider 370 can forward an incoming call to the devices 310 and 320 of the user with the single phone number, without separately processing the call in the network.

Figure 4:
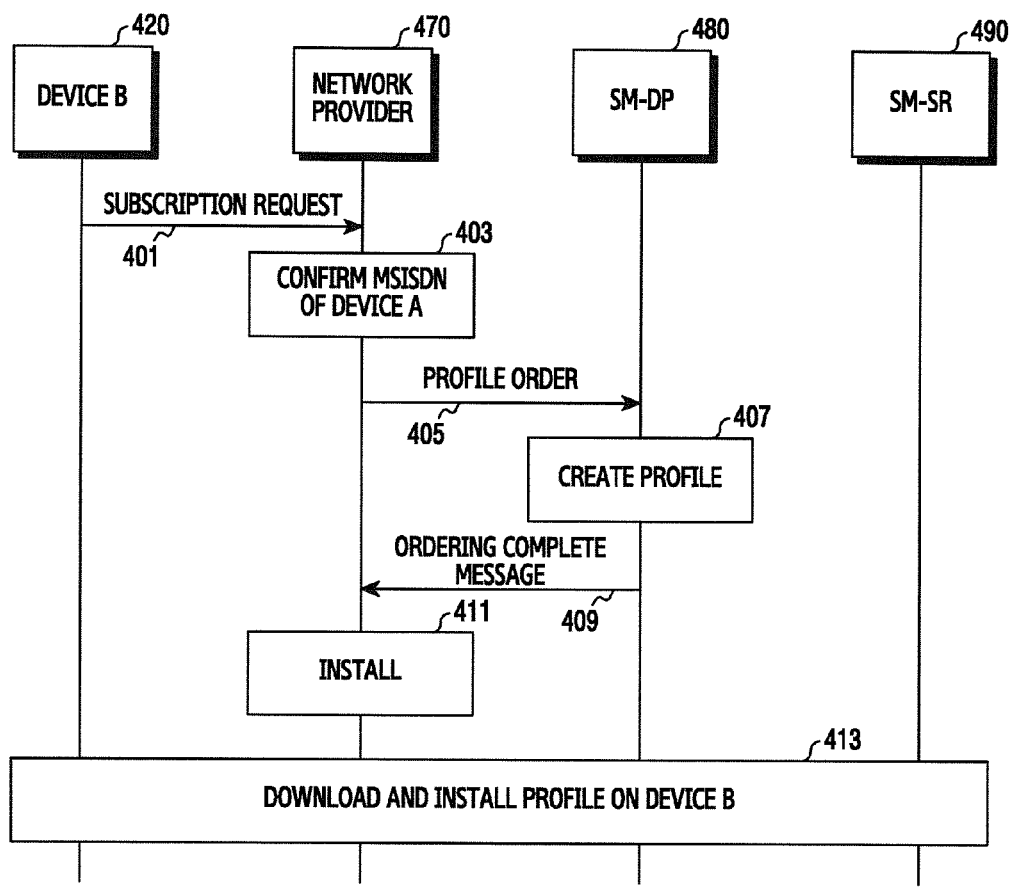
FIG. 4 illustrates signal exchange for installing a subscriber profile in a wireless communication system according to an embodiment of the present disclosure.

FIG. 4 depicts signal exchange for installing a subscriber profile in a wireless communication system according to an embodiment of the present disclosure. FIG. 4 shows signal exchange for the procedure of FIG. 3.

Referring to FIG. 4, in operation 401, a device B 420 sends a subscribe request to a network provider 470. The subscribe request includes SR-ID and EID of the device B 420 and ICCID of another device (e.g., a device A) of the user. The subscribe request can be delivered over a radio channel. In this case, the device B 420 uses a temporary profile. According to another embodiment of the present disclosure, the subscription can be requested offline. In this case, the operation 401 can be omitted.

In operation 403, the network provider 470 confirms the MSISDN, that is, the subscriber identification number of the device A. The network provider 470 can retrieve a profile of the device A using the ICCID of the device A received using the subscribe request, and confirm the MSISDN (e.g., MSISDN2) of the device A in the profile. The network provider 470 assigns the same MSISDN as the MSISDN of the device A, to the device B 420. In addition, the network provider 470 can assign IMSI and K for the device B 420.

In operation 405, the network provider 470 sends a profile order to an SM-DP server 480. That is, the network provider 470 provides necessary information for creating a profile of the device 420, to the SM-DP server 480. For example, the network provider 470 can provide the SM-DP server 480 with the MSISDN (e.g., MSISDN1), the IMSI (e.g., IMSI2), and the K (e.g., K2) assigned to the device B 420. The MSISDN assigned to the device B 420 has the same value as the MSISDN assigned to the device A.

In operation 407, the SM-DP server 480 creates a profile of the device B 420. That is, the SM-DP server 480 packages the profile based on the information received from the network provider 470. In so doing, the SM-DP server 480 can generate a key for encrypting the profile. For example, the profile can include MNO-SD, NAA, and CASD.

In operation 409, the SM-DP server 480 sends an order completion message to the network provider 470. The order completion message notifies that the profile creation is successfully completed. The order completion message includes information for registering the created profile in a backend system of the network provider 470. For example, the order completion message can include the MSISDN (e.g., MSISDN1), the IMSI (e.g., IMSI2), and the K (e.g., K2) assigned to the device B 420, and the ICCID of the device B 420.

In operation 411, the network provider 470 installs the profile of the device B 420 in a system of the network. That is, the network provider 470 registers the profile of the device B 420. For example, the system in the network can include one of a home location register (HLR), an authentication center (AuC), and a home subscriber server (HSS).

In operation 413, the profile is downloaded to the device B 420 and installed on the device B 420. For example, the SM-DP server 480 can provide the profile to an SM-SR server 490, and the SM-SR server 490 can send the profile to the device B 420. In so doing, the profile can be transmitted over a secure transport channel. The device B 420 decrypts and installs the profile. At this time, the device B 420 can communicate with the SM-SR server 490 using a temporary profile.

Through the procedures of FIG. 3 and FIG. 4, the same subscriber identification number (e.g., MSISDN), that is, the same phone number can be assigned to a plurality of devices possessed by one user. However, when the multiple devices access the network using the same subscriber identification number, an unexpected error can occur. Hence, a method for controlling the network access of the devices is demanded.

Hereafter, to ease the understanding, the devices having the same subscriber identification number are refereed to be in a paring relationship.

The device needs to check a profile state of other device paired. Further, the device needs to request to change the profile state of the paired device. For doing so, the subscriber information module (e.g., the eUICC) of the device can include general components such as EID, type, version, production date, platform management credentials, available memory, and at least one profile, and further include information about the paired device. For example, the paired device information can include at least one of EID, ICCID, and state information of a subscriber information module of the paired device.

Figure 5:
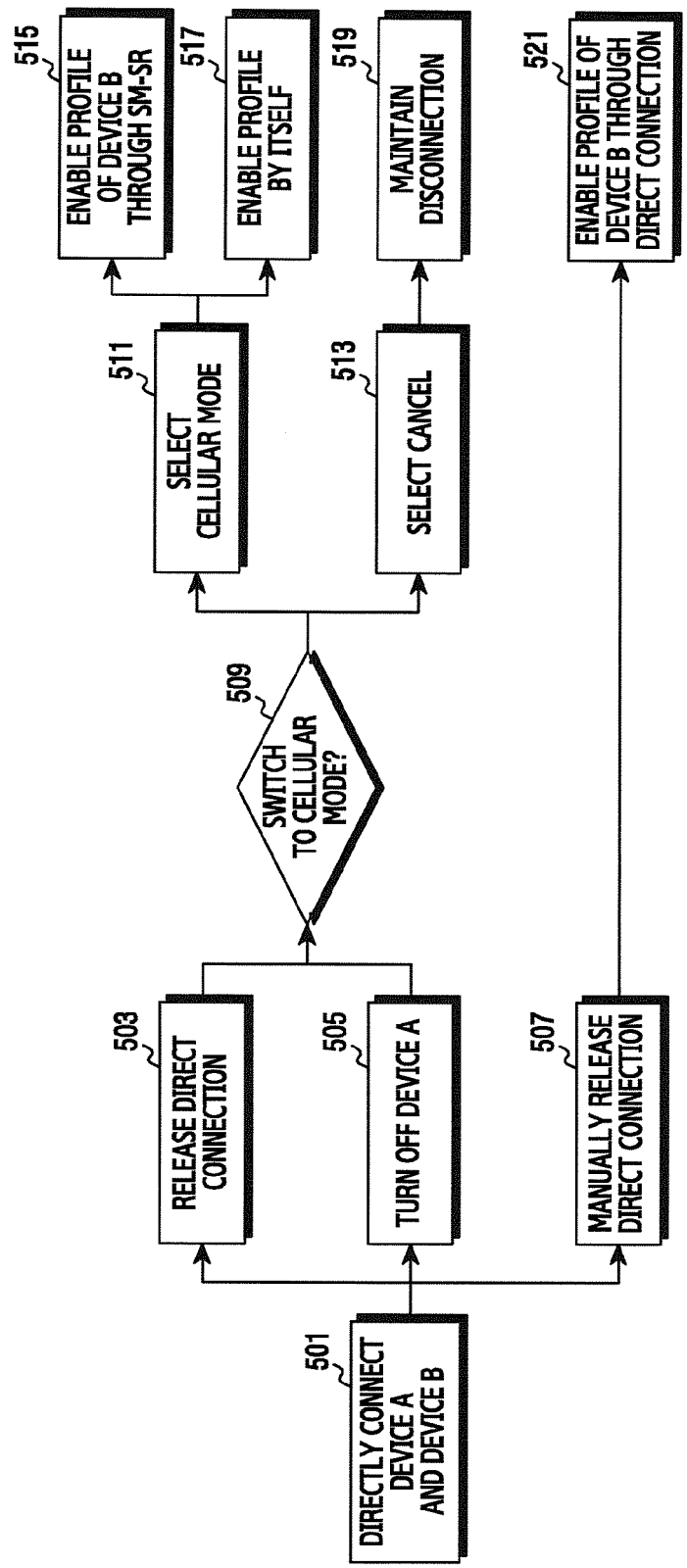
FIG. 5 illustrates operation mode change of a device in a wireless communication system according to an embodiment of the present disclosure.

FIG. 5 illustrates operation mode change of a device in a wireless communication system according to an embodiment of the present disclosure. In FIG. 5, a device A and a device B have the same subscriber identification number, and the device B operates as follows when the device A is primary communication equipment and the device B is secondary communication equipment. The operations of FIG. 5 can take place when a profile of the device B is disabled.

Referring to FIG. 5, in operation 501, the device A and the device B are directly connected. That is, the device B operates in a direct connection mode. Hence, the device B can indirectly use a service of a cellular network via the device A.

After the operation 501, the direct connection can be released in operation 503, the device A can be turned off in operation 505, or the direct connection can be released manually in operation 507. The operation 503 can arise when the user carrying the device B alone gets away from the device A. The operation 505 can arise when the user turns off the device A or the device A runs out of battery. The operation 507 can arise when the direct connection is released according to a command of a user and manipulation.

In response to the operation 503 or 505, the device B can display a screen which inquires about transition to a cellular mode, through a display means in operation 509. The screen can include an interrogative sentence inquiring about the transition to the cellular mode, and at least one button (e.g., Yes, Connect, Cancel, etc.) for inputting selection of a user. Yet, when an output means of the device B is not the display means, the transition to the cellular mode can be inquired in other fashions. For example, the device B can inquire about the cellular mode transition using sound, voice message, vibration, and light emission.

After the operation 509, the user can select the cellular mode transition in operation 511 or does not select the cellular mode transition in operation 513. In operation 513, the user selects cancel. The operation 511 and the operation 513 can selectively take place according to a manipulation of the user.

After the operation 511, a profile of the device B is enabled in operation 515. More specifically, the profile of the device B can be enabled through SM-SR in operation 515 or the device B itself can enable its profile in operation 517. In operation 515, a signal can be transmitted and received to and from outside. In operation 517, the signaling to the outside is unnecessary. After the operation 513, the disconnection is maintained in operation 519.

After the operation 507, the profile of the device B is enabled through direct connection in operation 521. Unlike the operation 503 or the operation 505, the device A and the device B are in a range allowing the communication through the direct connection in operation 507. Since the device A and the device B can exchange signals, the device B can enable the profile under control of the device A.

The mode change in various combinations of the operations of FIG. 5 is described in more detail by referring to FIG. 6 through FIG. 12.

Figure 6:
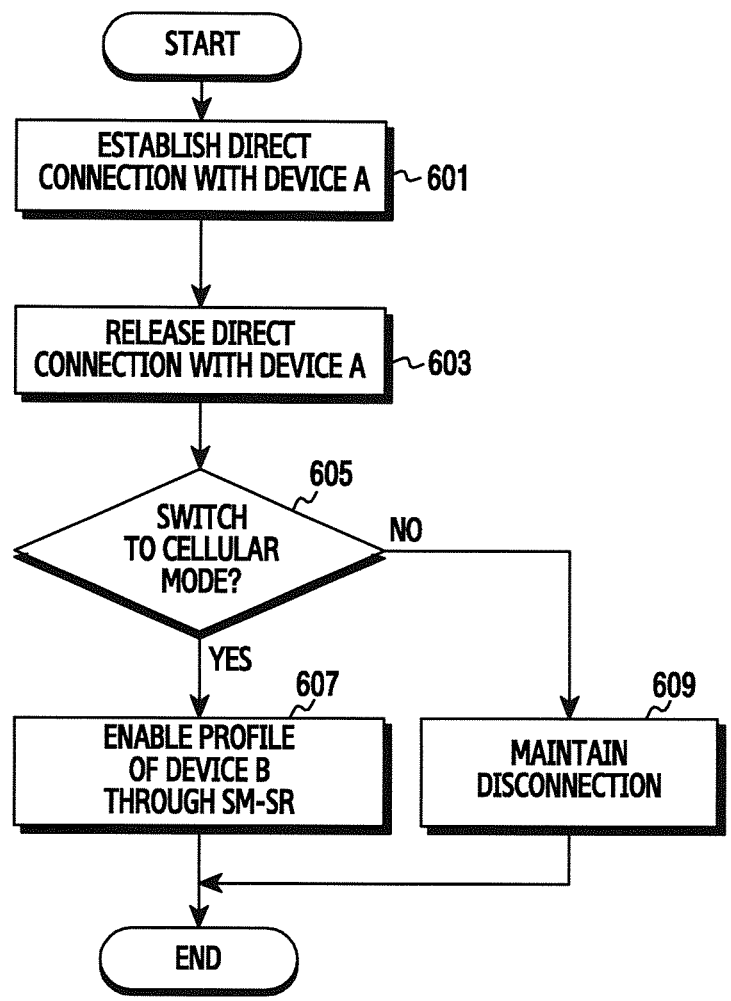
FIG. 6 illustrates a method for controlling a profile state of a device assigned the same subscriber identification number as another device in a wireless communication system according to an embodiment of the present disclosure.

FIG. 6 illustrates a method for controlling a profile state of a device assigned the same subscriber identification number as another device in a wireless communication system according to an embodiment of the present disclosure. In FIG. 6, the device A is initially connected to a cellular network, that is, a profile of the device A is enabled.

Referring to FIG. 6, a device B establishes direct connection with the device A in operation 601. The direct connection can be established using various short-range communication technologies. For example, the direct connection can use Bluetooth, wireless LAN, Zigbee, and so on. In so doing the device A is being connected to the cellular network.

In operation 603, the device B determines that the direct connection with the device A is released. The direct connection is released independently from selection of the user. For example, the direct connection can be lost when the device A and the device B get away from each other and thus leave the communication range. Alternatively, the direct connection can be lost when the device A is turned off.

In operation 605, the device B determines whether transition to the cellular mode is selected. For doing so, the device B can inquire of the user about the transition to the cellular mode. That is, the device B displays the screen inquiring about the cellular mode transition, through the display means. The screen can include a sentence inquiring of the user about the cellular mode switch and at least one button for inputting the selection of the user.

When the user selects the switch to the cellular mode, the device B enables its profile through the SM-SR server in operation 607. That is, the device B triggers the SM-SR server to enable the profile of the device B, and receives an enabling request from the SM-SR server. Hence, the device B can access a cellular network.

When the user does not select the switch to the cellular mode, the device B maintains the disconnected state in operation 609. That is, the device B does not enable the profile and not access the cellular network.

Figure 7:
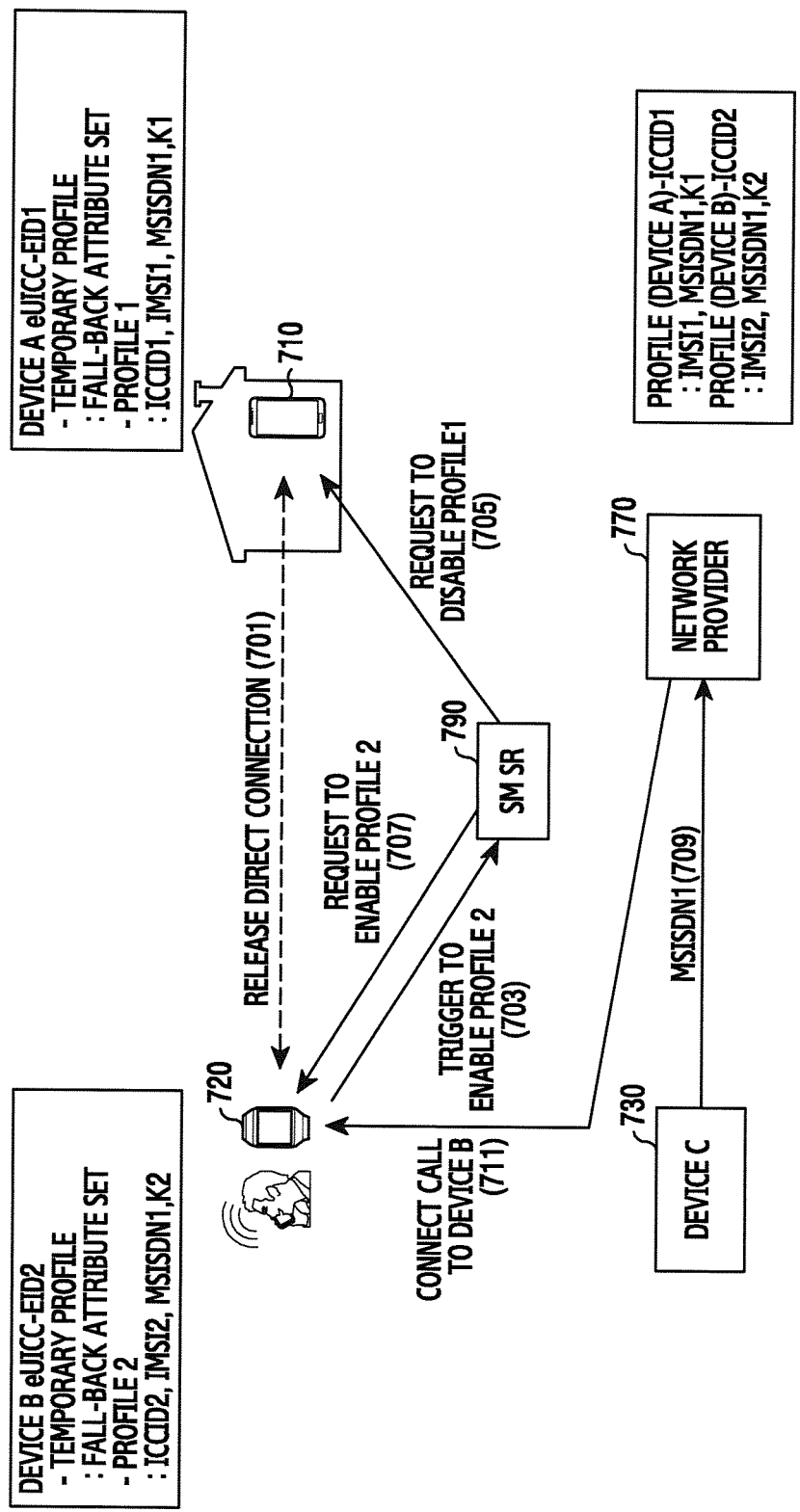
FIG. 7 illustrates a method for changing a profile state between devices assigned the same subscriber identification number in a wireless communication system according to an embodiment of the present disclosure.

FIG. 7 illustrates a procedure for changing a profile state between devices assigned the same subscriber identification number in a wireless communication system according to an embodiment of the present disclosure.

Referring to FIG. 7, in operation 701, direct connection between a device A 710 and a device B 720 is released. For example, as the device A 710 and the device B 720 get away from each other and leave a communication range, their direct connection can be lost. Alternatively, as the device A 710 is turned off, the direct connection can be lost.

In operation 703, the device B 720 sends a message for triggering to enable its profile2. The triggering message can be delivered using a temporary profile of the device B 720. The triggering message is transmitted to an SM-SR server 790 which manages the profile of the device B 720. That is, the device B 720 can identify the SM-SR server 790 with SR-ID in its subscriber information module, and send the message for triggering the profile2 to the SM-SR server 790 using the temporary profile.

In operation 705, the SM-SR server 790 requests the device A 710 to disable a profile1. The profile1 of the device A 710 and the profile2 of the device B 720 include the same subscriber identification number. Accordingly, when the profile2 is enabled, the profile1 is disabled. Hence, the SM-SR server 790 sends a profile1 disabling request to the device A 710. Yet, when the SM-SR for managing the subscriber information module of the device A 710 is not the SM-SR server 790, the SM-SR server 790 can send the disabling request to the SM-SR which manages the subscriber information module of the device A 710. The device A 710 disables the profile1. The device A 710 enables its temporary profile. That is, the device A 710 performs fall-back.

In operation 707, the SM-SR server 790 requests the device B 720 to enable the profile2. That is, the SM-SR server 790 sends a profile2 enabling request to the device B 720. The SM-SR server 790 can update state information of the profile2. That is, the SM-SR server 790 manages flag indicating states of profiles and records a current state of the profiles through the flag. The enabling request can be delivered through the connection based on the temporary profile of the device B 720. Hence, the profile2 of the device B 720 is enabled, and the device B 720 accesses a cellular network. Herein, a subscriber identification number of the profile2 is MSISDN1. When accessing the cellular network, the device B 720 can send the subscriber identification information (e.g., IMSI2) of the profile2. A network provider 770 can determine based on the subscriber identification information of the device B 720 that the subscriber identification number (e.g., MSISDN) of the device B 720 is the MSISDN1.

In operation 709, a third device C 730 makes a call destined for the MSISDN1 via a network provider 770. The device C 730 is possessed by another user different from the user of the device A 710 and the device B 720. That is, the other user makes the call using the MSISDN1 in order to talk with the user.

In operation 711, the network provider 770 connects the call to the device B 720. Since the device B 720 is now connected to the network using the MSISDN1, the call is routed to the device B 720. Hence, the user can receive the call using the device B 720.

Figure 8:
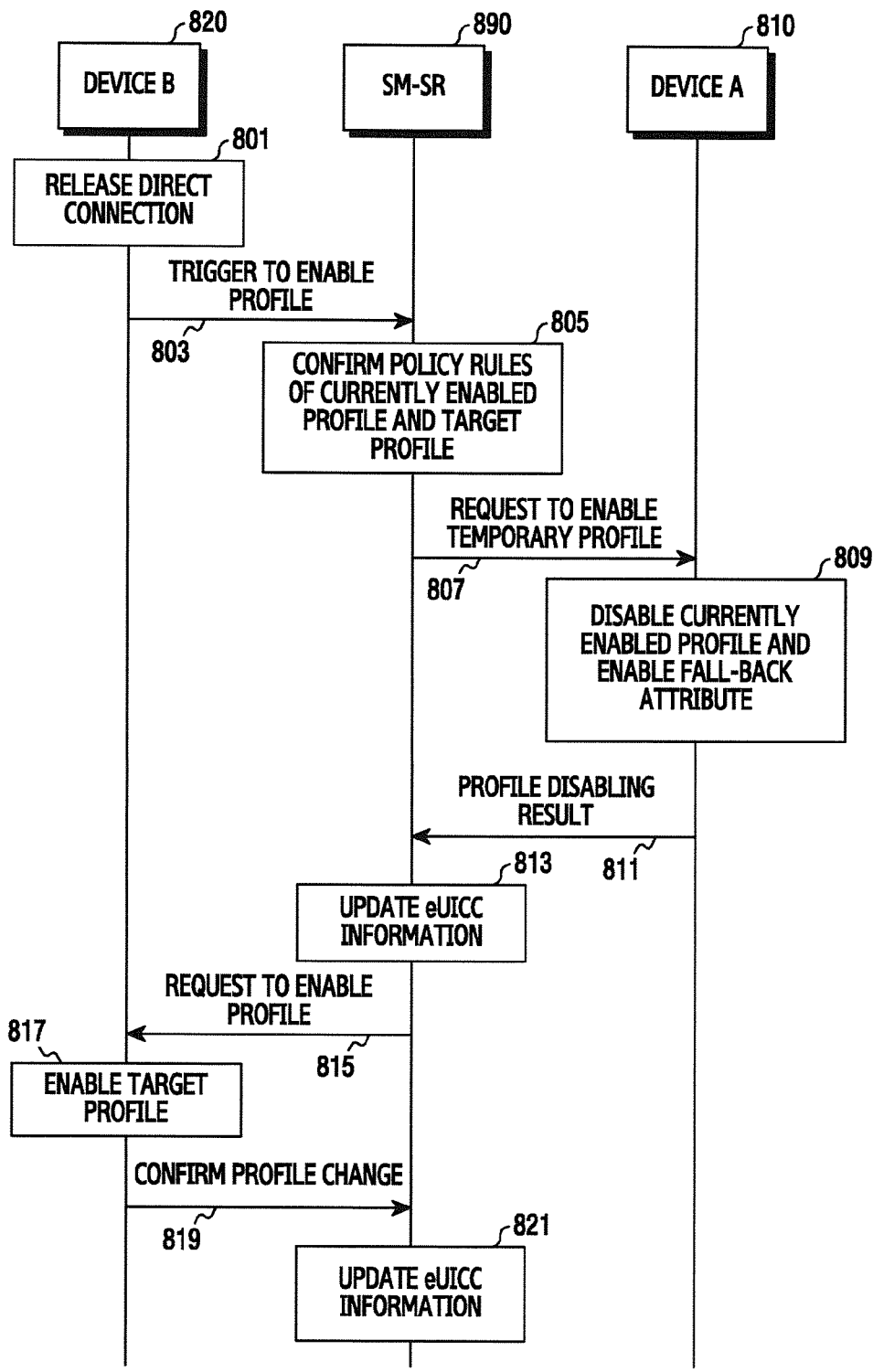
FIG. 8 illustrates signal exchange for changing a profile state between devices assigned the same subscriber identification number in a wireless communication system according to an embodiment of the present disclosure.

FIG. 8 illustrates signal exchange for changing a profile state between devices assigned the same subscriber identification number in a wireless communication system according to an embodiment of the present disclosure. FIG. 8 depicts the signal exchange for the procedure of FIG. 7.

Referring to FIG. 8, in operation 801, a device B 820 detects direct connection release from a device A 810. For example, as the device A 810 and the device B 820 get away from each other and leave a communication range, their direct connection can be lost. Alternatively, as the device A 810 is turned off, the direct connection can be lost.

In operation 803, the device B 820 sends a message for triggering to enable a profile (e.g., profile2) of the device B 820. The triggering message can be delivered using a temporary profile of the device B 820. More specifically, the device B 820 can identify an SM-SR server 890 with SR-ID in a subscriber information module of the device B 820, and send the message for triggering the profile2 to the SM-SR server 890 using the temporary profile. The triggering message can include EID and ICCID of the device B 820, and SR-ID, EID, and ICCID of the device A 810.

In operation 805, the SM-SR server 890 confirms a currently enabled profile and policy rules of a target profile. Herein, the currently enabled profile is the profile (e.g., profile1) of the device A 810, and the target profile is a profile (e.g., profile2) of the device B 820. The SM-SR server 890 can identify the currently enabled profile based on the ICCID of the device A 810 contained in the triggering message, and identify the target profile based on the ICCID of the device B 820. That is, the SM-SR server 890 determines whether switching between the profile of the device A 810 and the profile of the device B 820 is allowed. Policy rules about the switching can be referred to as policy-2 (POL2). In this embodiment, it is assumed that the switching is allowed.

In operation 807, the SM-SR server 890 requests the device A 810 to enable a temporary profile. That is, the SM-SR server 890 sends a temporary profile enabling request to the device A 810. This request is to disable the currently enabled profile of the device A 810. Yet, when an SM-SR for managing a subscriber information module of the device A 810 is not the SM-SR server 890, the SM-SR server 890 can send the temporary profile enabling request to the SM-SR which manages the subscriber information module of the device A 810.

In operation 809, the device A 810 disables the current enabled profile (e.g., profile1) and enables a fall-back attribute, that is, the temporary profile. Before doing so, although not depicted in FIG. 8, the device A 810 can confirm policy rules about whether the currently enabled profile can be disabled. The policy rules about whether the currently enabled profile can be disabled can be referred to as policy-1 (POL1).

In operation 811, the device A 810 notifies the profile disabling result to the SM-SR server 890. That is, the device A 810 sends a report about the profile disabling to the SM-SR server 890. The SM-SR server 890 can confirm that the profile (e.g., profile1) of the device A 810 is disabled.

In operation 813, the SM-SR server 890 updates eUICC information. That is, the SM-SR server 890 owns state information of profiles managed. Accordingly, the SM-SR server 890 records that the profile of the device A 810 is disabled. The eUICC Information can be referred to as an eUICC information set (EIS).

In operation 815, the SM-SR server 890 requests the device B 820 to enable the profile. That is, the SM-SR server 890 sends a profile enabling request to the device B 820. The enabling request can include identification information indicating the profile (e.g., profile2) to enable among at least one profile of the device B 820. For example, the identification information can include ISD-P Application Identifier (AID).

In operation 817, the device B 820 enables the target profile. That is, the device B 820 enables the profile (e.g., profile2) indicated by the SM-SR server 890. Before doing so, although not depicted, the device B 820 can check policy rules about whether the target profile enabling is permitted. The policy rules about whether the enabling is permitted can be referred to as a POL1.

In operation 819, the device B 820 sends a profile switch confirmation to the SM-SR server 890. That is, the device B 820 notifies profile switch completion to the SM-SR server 890. Hence, the SM-SR server 890 can confirm that the profile (e.g., profile2) of the device B 820 is enabled.

In operation 821, the SM-SR server 890 updates eUICC Information. That is, the SM-SR server 890 owns state information of profiles managed. Hence, the SM-SR server 890 records that the profile of the device B 820 is enabled. The eUICC information can be referred to as an EIS.

Figure 9:
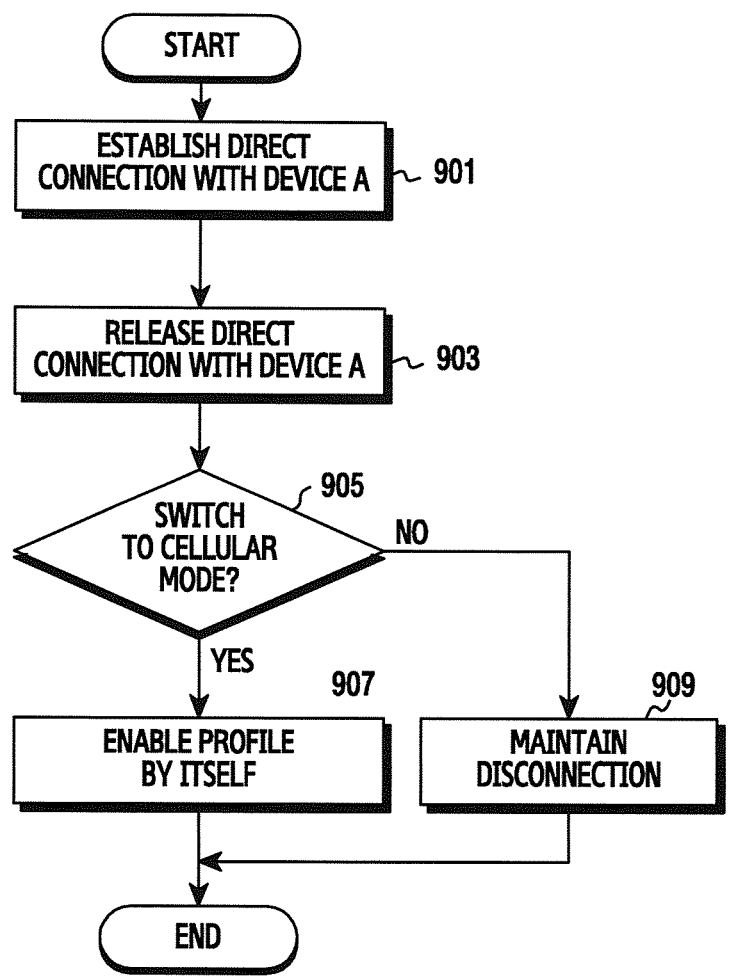
FIG. 9 illustrates a method for controlling a profile state of a device assigned the same subscriber identification number as another device in a wireless communication system according to another embodiment of the present disclosure.

FIG. 9 illustrates a method for controlling a profile state of a device assigned the same subscriber identification number as another device in a wireless communication system according to another embodiment of the present disclosure. In FIG. 9, a device A is initially connected to a cellular network, that is, a profile of the device A is enabled.

Referring to FIG. 9, a device B establishes direct connection with the device A in operation 901. The direct connection can be established using various short-range communication technologies. For example, the direct connection can use Bluetooth, wireless LAN, Zigbee, and so on. In so doing the device A is being connected to the cellular network.

In operation 903, the device B determines that the direct connection with the device A is released. The direct connection is released independently from selection of a user. For example, the direct connection can be lost when the device A and the device B get away from each other and thus leave a communication range. Alternatively, the direct connection can be lost when the device A is turned off.

In operation 905, the device B determines whether transition to the cellular mode is selected. For doing so, the device B can inquire of the user about the transition to the cellular mode. That is, the device B displays the screen inquiring about the switch to the cellular mode, through the display means. The screen can include a sentence inquiring of the user about the cellular mode transition and at least one button for inputting the selection of the user.

When the user selects the cellular mode switch, the device B itself enables its profile in operation 907. That is, the device B enables the profile including the same subscriber identification number as a subscriber identification number of the device A without signaling with outside. Hence, the device B can access the cellular network.

When the user does not select the cellular mode switch, the device B maintains the disconnected state in operation 909. That is, the device B does not enable the profile and not access the cellular network.

Figure 10:
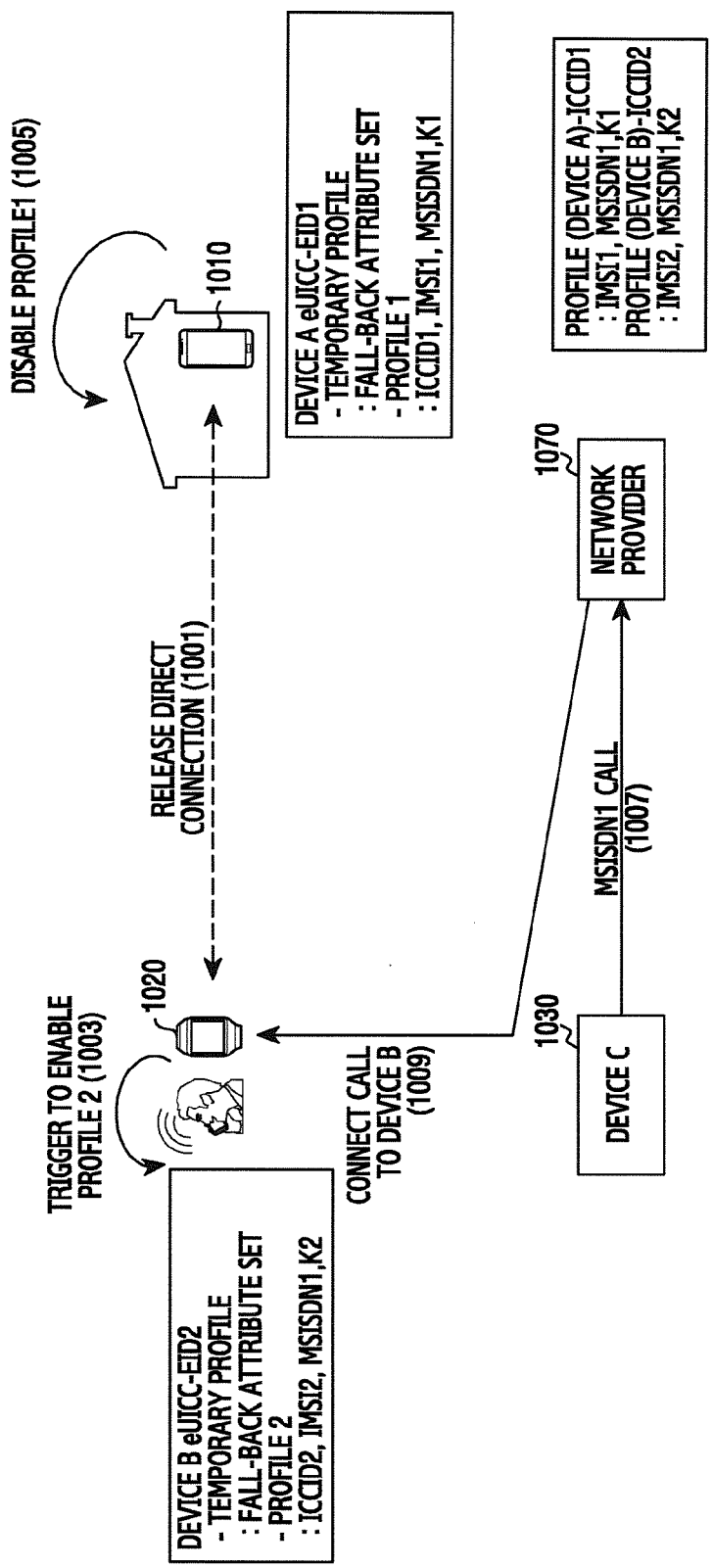
FIG. 10 illustrates profile state change between devices assigned the same subscriber identification number in a wireless communication system according to another embodiment of the present disclosure.

FIG. 10 illustrates profile state change between devices assigned the same subscriber identification number in a wireless communication system according to another embodiment of the present disclosure. In FIG. 10, the profile state is changed according to the control method of FIG. 9.

Referring to FIG. 10, in operation 1001, direct connection between a device A 1010 and a device B 1020 is released. For example, as the device A 1010 and the device B 1020 get away from each other and leave a communication range, their direct connection can be lost. Alternatively, as the device A 1010 is turned off, the direct connection can be lost.

In operation 1003, the device B 1020 triggers to enable a profile2 of the device B 1020. That is, the device B 1020 itself enables the profile. Hence, the device B 1020 accesses a cellular network. Herein, a subscriber identification number of the profile2 is MSISDN1. When accessing the cellular network, the device B 1020 can send subscriber identification information (e.g., IMSI2) of the profile2. Based on the subscriber identification information of the device B 1020, a network provider 1070 can determine that the subscriber identification number (e.g., MSISDN) of the device B 1020 is the MSISDN1.

In operation 1005, the device A 1010 disables a currently enabled profile1. That is, as the direct connection with the device B 1020 is released, the device A 1010 disables the profile1. The device A 1010 enables a temporary profile. That is, the device A 1010 performs fall-back. According to yet another embodiment of the present disclosure, the fall-back can be omitted.

In operation 1007, a third device C 1030 makes a call destined for the MSISDN1 via the network provider 1070. The device C 1030 is owned by another user different from the user of the device A 1010 and the device B 1020. That is, the other user makes the call using the MSISDN1 in order to talk with the user.

In operation 1009, the network provider 1070 connects the call to the device B 1020. Since the device B 1020 is being connected to the network using the MSISDN1, the call is routed to the device B 1020. Hence, the user can receive the call using the device B 1020.

Figure 11:
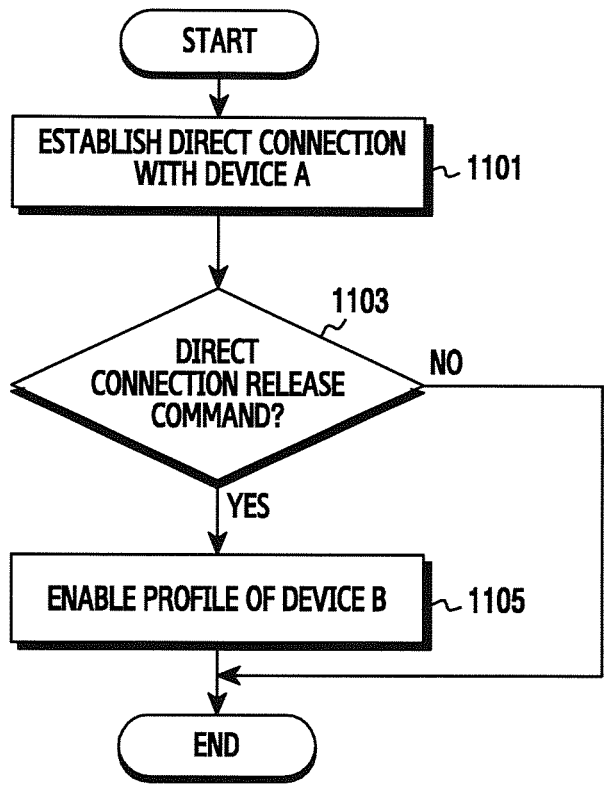
FIG. 11 illustrates a method for controlling a profile state of a device assigned the same subscriber identification number as another device in a wireless communication system according to yet another embodiment of the present disclosure.

FIG. 11 illustrates a method for controlling a profile state of a device assigned the same subscriber identification number as another device in a wireless communication system according to yet another embodiment of the present disclosure. In FIG. 11, a device A is initially connected to a cellular network, that is, a profile of the device A is enabled.

Referring to FIG. 11, a device B establishes direct connection with the device A in operation 1101. The direct connection can be established using various short-range communication technologies. For example, the direct connection can use Bluetooth, wireless LAN, Zigbee, and so on. In so doing the device A is being connected to the cellular network.

In operation 1103, the device B determines whether a command for releasing the direct connection with the device A is issued by a manual manipulation of a user. That is, the user himself/herself can release the wireless connection between the device A and the device B. In this case, the device B can recognize the direct connection release in advance, contrary to interruption due to channel degradation. For example, when the user inputs a release command through the device B, the device B can recognize in advance the direct connection release by detecting the release command input. Alternatively, when the user inputs a release command through the device A, the device B can recognize in advance the direct connection release by receiving a signal requesting the direct connection release from the device A.

In response to the direct connection release command, the device B enables a profile of the device B in operation 1105. That is, the device B enables the profile including the same subscriber identification number as the subscriber identification number of the device A. In so doing, the device B can enable the profile under control of the device A or based on the determination of the device B. When enabling the profile under the control of the device A, the device B can determine the profile enabling request based on the direct connection release request signal, or receive a separate enabling request signal. When enabling the profile based on own determination, the device B can send a profile disabling request signal to the device A. Thus, the device B can access the cellular network.

Figure 12:
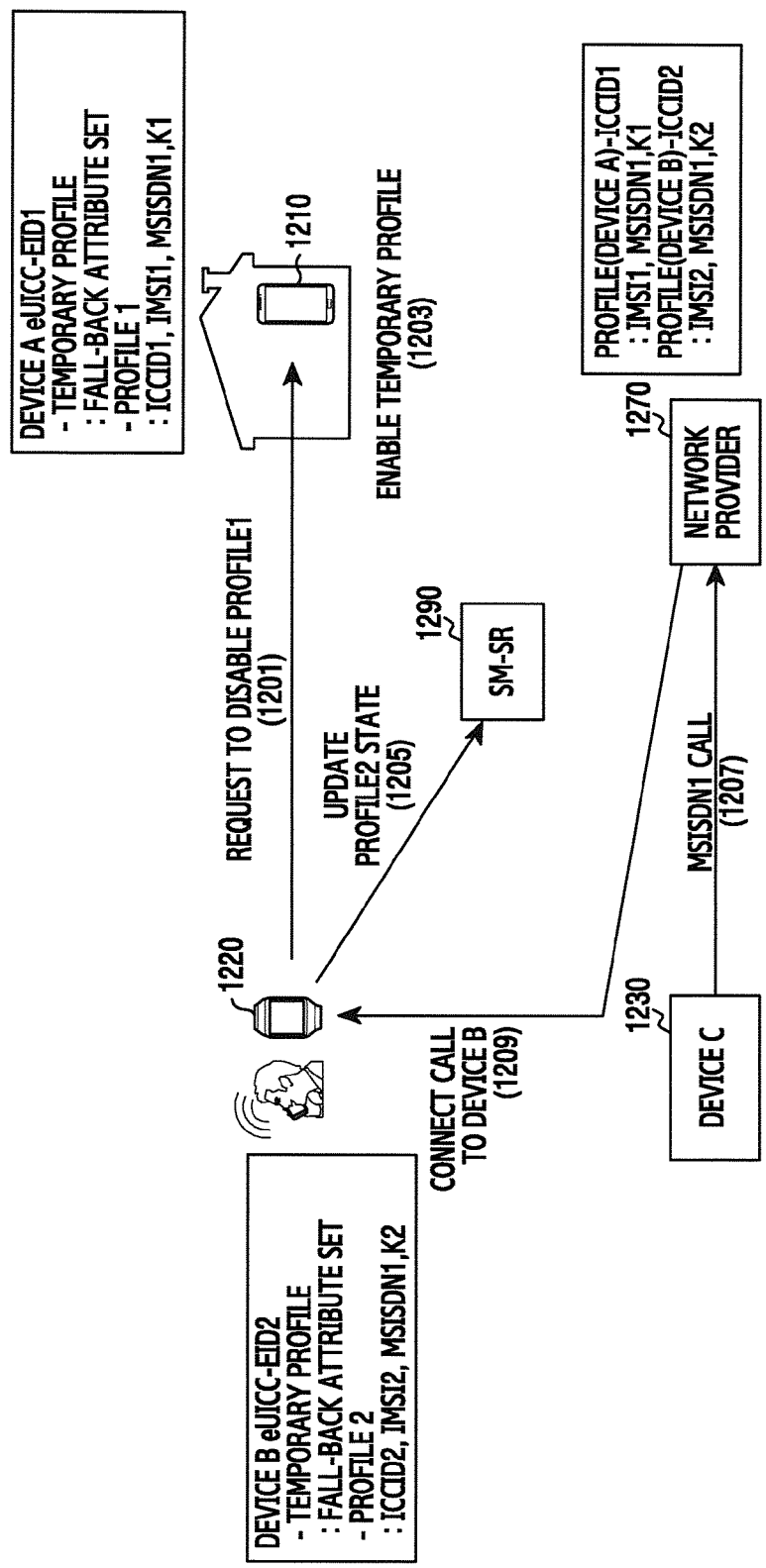
FIG. 12 illustrates profile state change between devices assigned the same subscriber identification number in a wireless communication system according to yet another embodiment of the present disclosure.

FIG. 12 illustrates profile state change between devices assigned the same subscriber identification number in a wireless communication system according to yet another embodiment of the present disclosure. In FIG. 12, the profile state is changed according to the control method of FIG. 11.

Referring to FIG. 12, in operation 1201, a device B 1220 requests a device A 1210 to disable a profile1. That is, the device B 1220 sends a request for disabling the profile1, to the device A 1210. According to still another embodiment of the present disclosure, the device A 1210 can request the device B 1220 to enable the profile2.

In operation 1203, the device A 1210 disables the currently enabled profile1 and enables a temporary profile. That is, the device A 1210 performs fall-back. According to still another embodiment of the present disclosure, the fall-back can be omitted.

In operation 1205, the device B 1220 requests an SM-SR server 1290 to update a state of a profile2. That is, the device B 1220 sends a state update request of the profile2 to the SM-SR server 1290. The state update request notifies the enabled profile2. The SM-SR server 1290 updates state information of the profile1. That is, the SM-SR server 1290 manages a flag indicating states of profiles, and records a current state of the profiles using the flag. Before or after sending the state update request, the device B 1220 enables the profile2. Hence, the device B 1220 accesses a cellular network using the profile2. When accessing the cellular network, the device B 1220 can send subscriber identification information (e.g., IMSI2) of the profile2. A network provider 1270 can determine based on the subscriber identification information of the device B 1220 that a subscriber identification number (e.g., MSISDN) of the device B 1220 is the MSISDN1.

In operation 1207, a third device C 1230 makes a call destined for the MSISDN1 via the network provider 1270. The device C 1230 is owned by another user different from the user of the device A 1210 and the device B 1220. That is, the other user makes the call using the MSISDN1 in order to talk with the user.

In operation 1209, the network provider 1270 connects the call to the device B 1220. Since the device B 1220 is being connected to the network using the MSISDN1, the call is routed to the device B 1220. Hence, the user can receive the call using the device B 1220.

Figure 13:
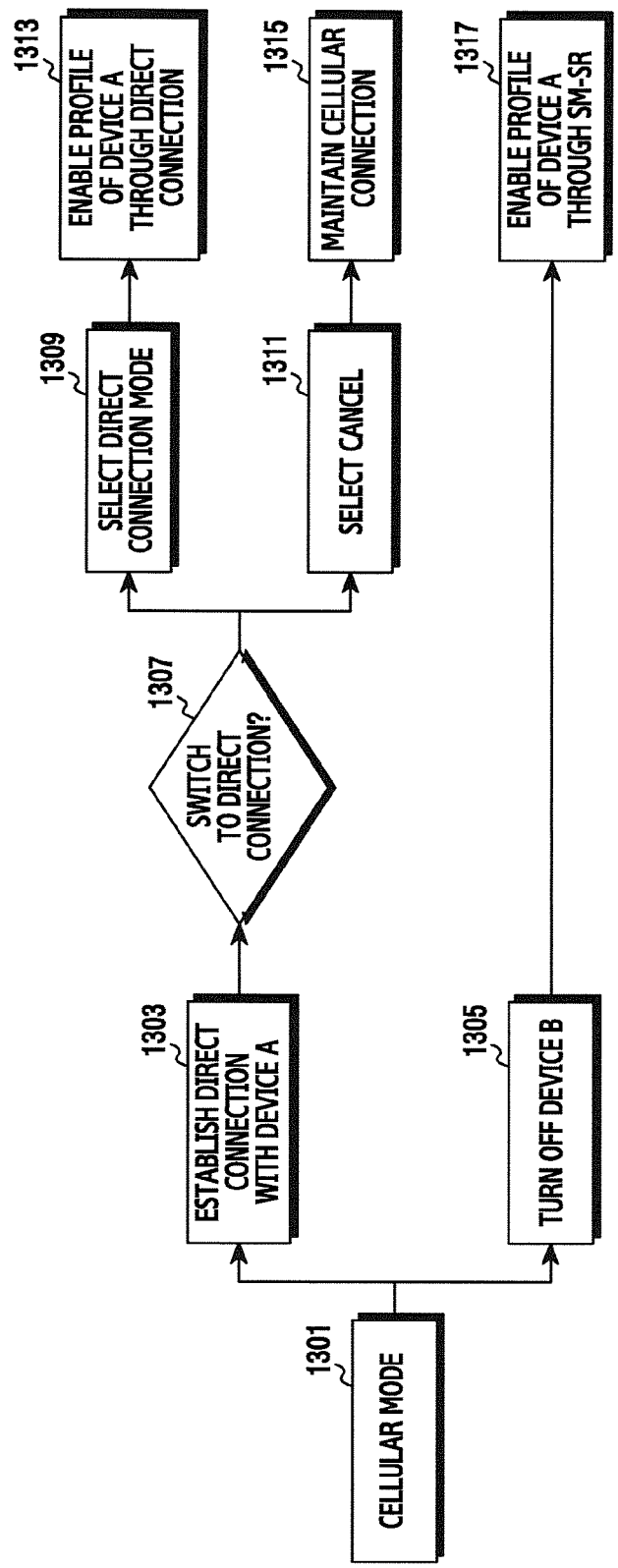
FIG. 13 illustrates operation mode change of a device in a wireless communication system according to an embodiment of the present disclosure.

FIG. 13 depicts operation mode change of a device in a wireless communication system according to an embodiment of the present disclosure. In FIG. 13, a device A and a device B have the same subscriber identification number, and the device B operates as follows when the device A is primary communication equipment and the device B is secondary communication equipment. The operations of FIG. 13 can take place when a profile of the device B is enabled.

Referring to FIG. 13, the device B operates in a cellular mode in operation 1301. That is, the device B enables a profile of the device B. That is, the device B can directly use a cellular network service without the aid of the device A.

After the operation 1301, direct connection can be established in operation 1303 or the device B can be turned off in operation 1305. In operation 1303, the device A and the device B get close to each other and enter a direct connection range. In operation 1305, the user may turn off the device B or the device B may run out of battery.

After the operation 1303, the device B can display a screen inquiring about switching to the direct connection through a display means in operation 1307. The screen can include an interrogative sentence inquiring about the transition to the cellular mode, and at least one button (e.g., Yes, Connect, Cancel, etc.) for inputting selection of the user. Yet, when an output means of the device B is not the display means, the cellular mode switching can be inquired in other fashions. For example, the device B can inquire about the cellular mode switching using sound, voice message, vibration, and light emission.

Next, the user can select the direct connection switching in operation 1309, or the user may not select the direct connection switching in operation 1311. That is, the user selects Cancel in operation 1311. The operation 1309 and the operation 1311 can selectively arise according to a manipulation of a user.

After the operation 1309, a profile of the device A is enabled through the direct connection in operation 1313. Unlike the operation 1305, the device A and the device B are in the direct connection range in operation 1303. Since the device A and the device B can exchange signals, the device B can send a signal requesting to enable the profile to the device A. In so doing, the device B can disable a profile of the device B. After the operation 1311, the device B stays in the cellular mode in operation 1315.

After the operation 1305, the profile of the device A is enabled through an SM-SR in operation 1317. For doing so, the device B can send and receive signals to and from outside.

The mode change in various combinations of the operations of FIG. 13 is described in more detail by referring to FIG. 14 through FIG. 17.

Figure 14:
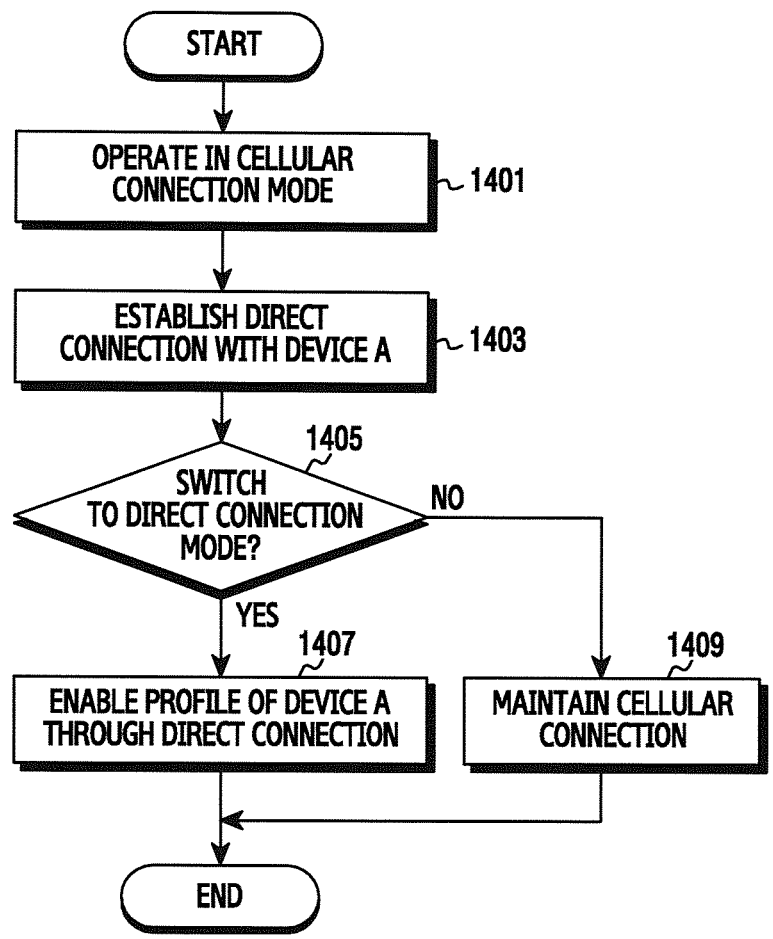
FIG. 14 illustrates a method for controlling a profile state of a device assigned the same subscriber identification number as another device in a wireless communication system according to still another embodiment of the present disclosure.

FIG. 14 illustrates a method for controlling a profile state of a device assigned the same subscriber identification number as another device in a wireless communication system according to still another embodiment of the present disclosure. In FIG. 14, a device B is initially connected to a cellular network, that is, a profile of the device B is enabled.

Referring to FIG. 14, the device B is operating in a cellular connection mode in operation 1401. That is, the device B enables a profile of the device B (e.g., profile2) and is connected to the cellular network. Herein, the profile2 has the same subscriber identification number as a profile (e.g., profile1) of the device A, that is, the same MSISDN (e.g., MSISDN1) as MSISDN. While the device B operates in the cellular connection mode, the profile1 of the device A is disabled.

The device B establishes direct connection with the device A in operation 1403. That is, the device B can enter a communication range of the device A according to movement of a user, discover the device A, and establish the direct connection with the device A. Alternatively, as the user activates the direct connection function of the device A and the device B, the device B can establish the direct connection with the device A. For example, the direct connection can adopt Bluetooth, wireless LAN, Zigbee, and the like. In so doing, the device B maintains the connection to the cellular network.

In operation 1405, the device B determines whether transition to a direct connection mode is selected. For doing so, the device B can inquire of the user about the direct connection mode switching. That is, the device B displays a screen inquiring about the direct connection mode switching, through a display means. The screen can include a sentence inquiring of the user about the direct connection mode switching and at least one button for inputting the selection of the user. Herein, in the direct connection mode, the device B indirectly accesses the cellular network via the device A directly connected, rather than directly accessing the cellular network.

When the user selects the direct connection mode switching, the device B enables the profile (e.g., profile1) of the device A through the direct connection in operation 1407. That is, the device B sends a profile enabling request to the device A. Further, the device B disables the profile (profile2) of the device B 1520.

When the user does not select the direct connection mode switching, the device B maintains the cellular connection, that is, stays in the cellular connection mode in operation 1409. Hence, the profile of the device A remains disabled, and the user can use a cellular network service using the device B.

Figure 15:
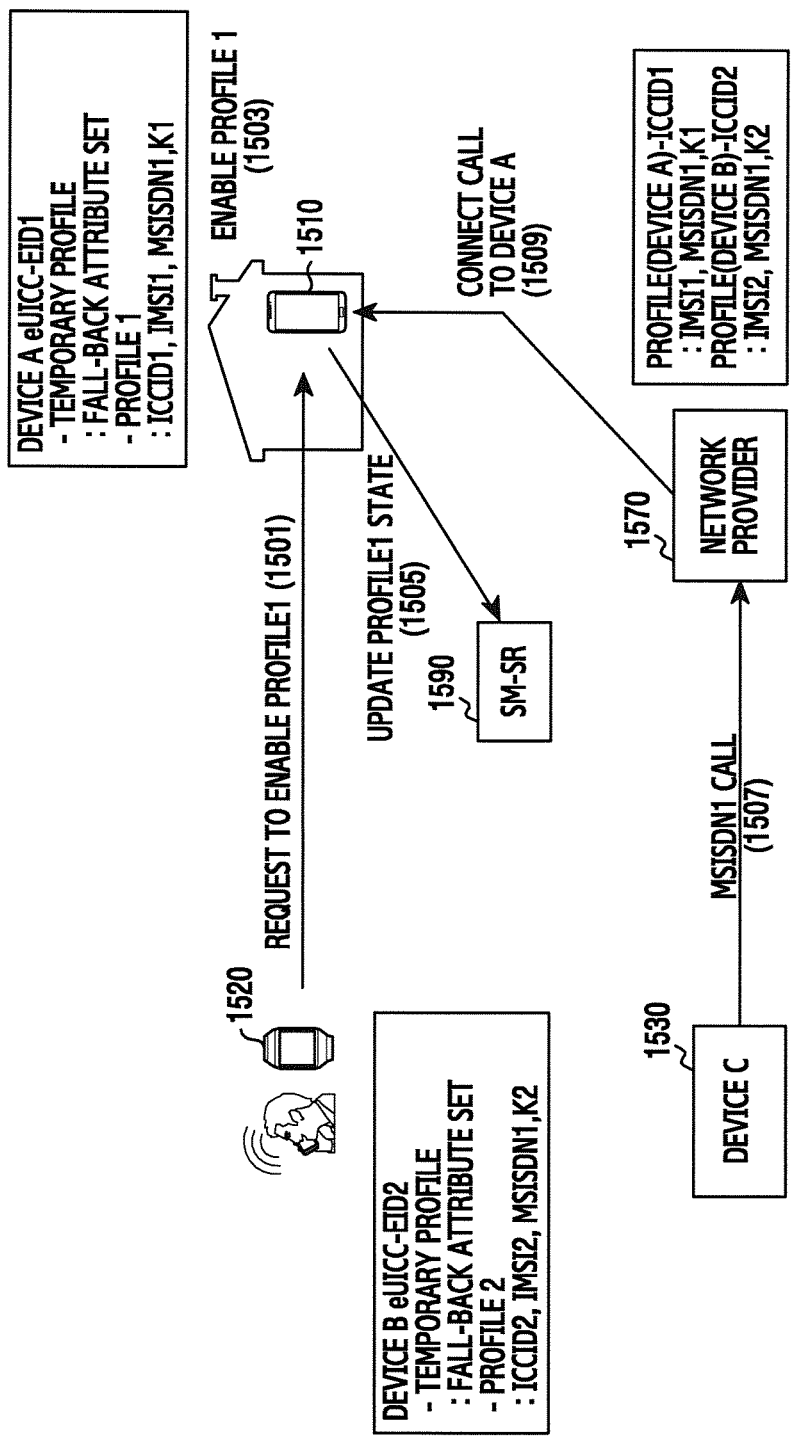
FIG. 15 illustrates profile state change between devices assigned the same subscriber identification number in a wireless communication system according to still another embodiment of the present disclosure.

FIG. 15 depicts profile state change between devices assigned the same subscriber identification number in a wireless communication system according to still another embodiment of the present disclosure. In FIG. 15, the profile state is changed according to the control method of FIG. 14.

Referring to FIG. 15, in operation 1501, a device B 1520 requests a device A 1510 to enable a profile1. That is, the device B 1520 sends a request for enabling the profile1, to the device A 1510. The device B 1520 can disable a profile2 of the device B 1520.

In operation 1503, the device A 1510 enables the profile1. The profile1 and the profile2 include MSISDN1 as their subscriber identification number. In addition, the device A 1510 can disable a temporary profile. Hence, the device A 1510 accesses a cellular network using the profile2. When accessing the cellular network, the device B 1520 can send subscriber identification information (e.g., MISI2) of the profile2. A network provider 1570 can determine based on the subscriber identification information of the device B 1520 that the subscriber identification number (e.g., MSISDN) of the device B 1520 is the MSISDN1.

In operation 1505, the device A 1510 requests an SM-SR server 1590 to update a state of the profile1. That is, the device A 1510 sends a state update request of the profile1 to the SM-SR server 1590. The state update request notifies the enabled profile1. The SM-SR server 1590 updates state information of the profile1. That is, the SM-SR server 1590 manages a flag indicating states of profiles, and records a current state of the profiles using the flag.

In operation 1507, a third device C 1530 makes a call destined for the MSISDN1 via the network provider 1570. The device C 1530 is owned by another user different from the user of the device A 1510 and the device B 1520. That is, the other user makes the call using the MSISDN1 in order to talk with the user.

In operation 1509, the network provider 1570 connects the call to the device A 1510. Since the device A 1510 is being connected the network using the MSISDN1, the call is routed to the device A 1510. Hence, the user can receive the call using the device A 1510.

Figure 16:
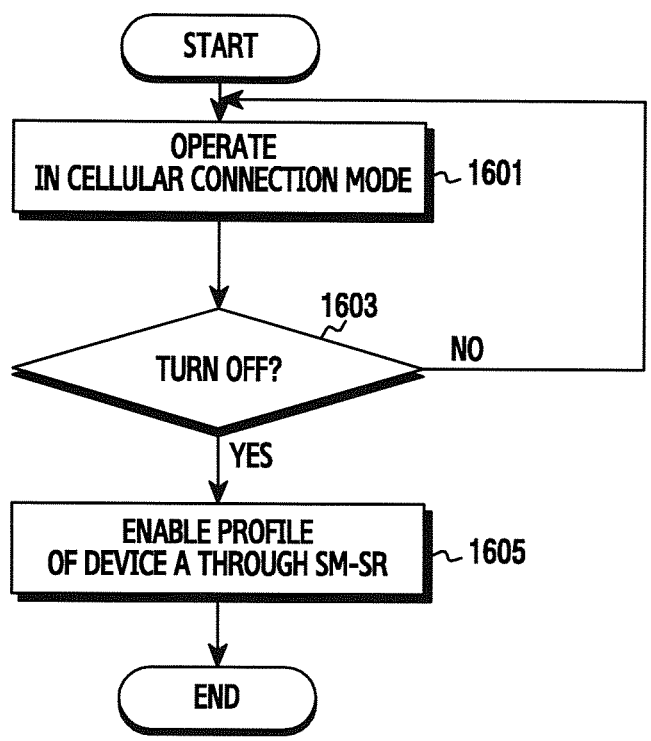
FIG. 16 illustrates a method for controlling a profile state of a device assigned the same subscriber identification number as another device in a wireless communication system according to a further embodiment of the present disclosure.

FIG. 16 illustrates a method for controlling a profile state of a device assigned the same subscriber identification number as another device in a wireless communication system according to a further embodiment of the present disclosure. In FIG. 16, a device B is initially connected to a cellular network, that is, a profile of the device B is enabled.

Referring to FIG. 16, the device B is operating in a cellular connection mode in operation 1601. That is, the device B enables a profile of the device B (e.g., profile2) and is connected to the cellular network. Herein, the profile2 has the same subscriber identification number as a profile (e.g., profile1) of the device A, that is, the same MSISDN (e.g., MSISDN1) as MSISDN. While the device B operates in the cellular connection mode, the profile1 of the device A is disabled.

In operation 1603, the device B determines whether the device B is turned off. The device B can be turned off according to a command of a user or the battery runout. When the user inputs a power off command through the device B, the device B can recognize the power off in advance by detecting the input of the power off command. Alternatively, when the remaining battery capacity falls below a threshold, the device B can recognize the power off in advance.

When turned off, the device B requests an SM-SR server to enable a profile of the device A in operation 1605. That is, the device B sends a profile enabling request of the device A to the SM-SR server. The profile of the device A is a profile (e.g., profile1) having the MSISDN1. Herein, the enabling request is delivered to the SM-SR server which manages the profile of the device A. The device B can identify the SM-SR server which manages the profile of the device A, based on paired device information stored in the profile. The device B can disable the profile of the device B.

Figure 17:
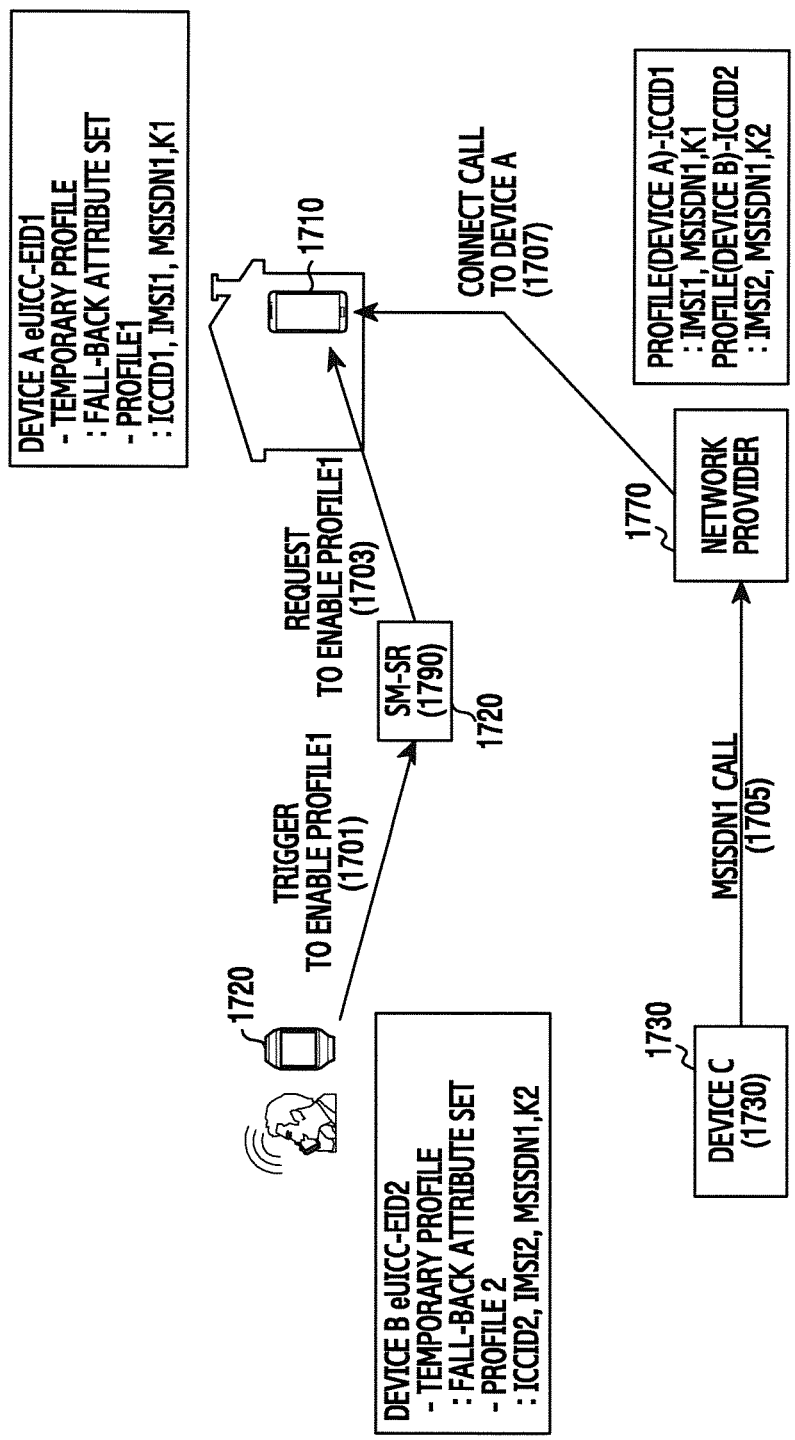
FIG. 17 illustrates profile state change between devices assigned the same subscriber identification number in a wireless communication system according to a further embodiment of the present disclosure.

FIG. 17 illustrates profile state change between devices assigned the same subscriber identification number in a wireless communication system according to a further embodiment of the present disclosure. In FIG. 17, the profile state is changed according to the control method of FIG. 16.

Referring to FIG. 17, in operation 1701, a device B 1720 triggers an SM-SR server 1790 to enable a profile1 of a device A 1710. That is, the device B 1720 sends a message for triggering to enable the profile1, to the device A 1710. In so doing, the device B 1720 can disable a profile2 of the device B 1720.

In operation 1703, the SM-SR server 1790 requests the device A 1710 to enable the profile1. That is, the SM-SR server 1790 sends a request for enabling the profile1, to the device A 1710. The SM-SR server 1790 can update state information of the profile2. That is, the SM-SR server 1790 manages flag indicating states of profiles, and records a current state of the profiles through the flag. The enabling request can be delivered through the connection based on a temporary profile of the device A 1710. Accordingly, the profile1 of the device A 1710 is enabled, and the device A 1710 accesses a cellular network. Herein, a subscriber identification number of the profile1 is MSISDN1. When accessing the cellular network, the device B 1720 can send subscriber identification information (e.g., IMSI2) of the profile2. A network provider 1770 can determine based on the subscriber identification information of the device B 1720 that the subscriber identification number (e.g., MSISDN) of the device B 1720 is the MSISDN1.

In operation 1705, a third device C 1730 makes a call destined for the MSISDN1 via the network provider 1770. The device C 1730 is owned by another user different from the user of the device A 1710 and the device B 1720. That is, the other user makes the call using the MSISDN1 in order to talk with the user.

In operation 1707, the network provider 1770 connects the call to the device A 1710. Since the device A 1710 is being connected the network using the MSISDN1, the call is routed to the device A 1710. Hence, the user can receive the call using the device A 1710.

The user can enable profiles of secondary devices (e.g., two or more wearable devices) at the same time. Such profiles have the same subscriber identification number (e.g., MSISDN), but can have different IMSI values or K values. Since the secondary devices have different IMSI values, the secondary devices have no difficulty in accessing the cellular network at the same time. Further, the primary device of the user (e.g., a smart phone) can concurrently access the cellular network together with the secondary devices.

When the multiple devices access the cellular network at the same time, one of the devices becomes a master device and at least one of the remaining devices becomes a slave device. The master device has capacity information of at least one slave device. The capability information includes at least one of a service type, a memory capacity, a display resolution, a battery capacity, and a remaining battery capacity of the slave device. Since the remaining battery capacity is dynamic information, the at least one slave device can periodically send a remaining battery capacity of the at least one slave device to the master device. Considering roles and functions of the master device, it is advantageous to select a device of relatively better battery and computing capabilities, such as a smart phone, as the master device.

Based on the capability and the remaining battery capacity of at least one slave device, the master device determines whether to enable or to disable the profile. When multiple slave devices simultaneously access the cellular network and a call is incoming, the master device can determine which device the call is forwarded to.

The cellular network routes an incoming call from another user to the master device, and the master device determines which device notifies the call to the user. The master device can select the call receiving device based on stored device information. An outgoing call can be unicast by a single device. Alternatively, an emergency call or a call destined for all of devices can be broadcast/multicast.

Figure 18:
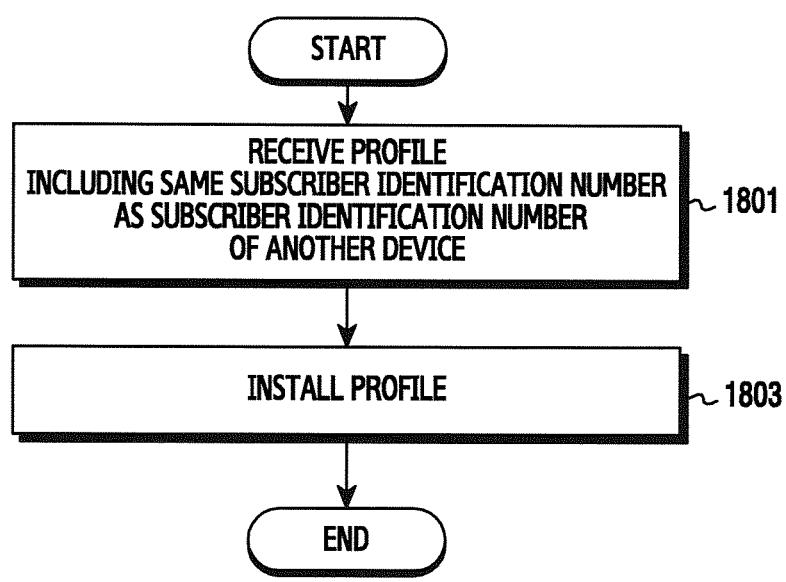
FIG. 18 illustrates operations of a user device in a wireless communication system according to an embodiment of the present disclosure.

FIG. 18 illustrates operations of a user device in a wireless communication system according to an embodiment of the present disclosure. FIG. 18 depicts a method for installing a profile in the user device.

Referring to FIG. 18, the device receives a profile including the same subscriber identification number as a subscriber identification number of another device in operation 1801. Herein, the subscriber identification number is identification information for determining a routing destination of a call, and can be referred to as a phone number or MSISDN. The profile is received from an SM-SR server corresponding to a subscriber information module (e.g., an eUICC) installed on the device. The device can access a network using a temporary profile installed at the manufacturing of the subscriber information module, and then receive the profile.

In operation 1803, the device installs the profile. That is, the device installs the profile in a storage space of the subscriber information module. That is, the device determines whether the received profile relates to a subscriber information module of the device, and then installs the profile. The subscriber information module contains unique identification information (e.g., EID). The device can determine based on the identification information of the profile whether the received profile relates to the subscriber information module of the device. After installing the profile, the device may not immediately enable the profile. For example, the device can determine whether to enable the installed profile, based on a profile state of the other device.

Figure 19:
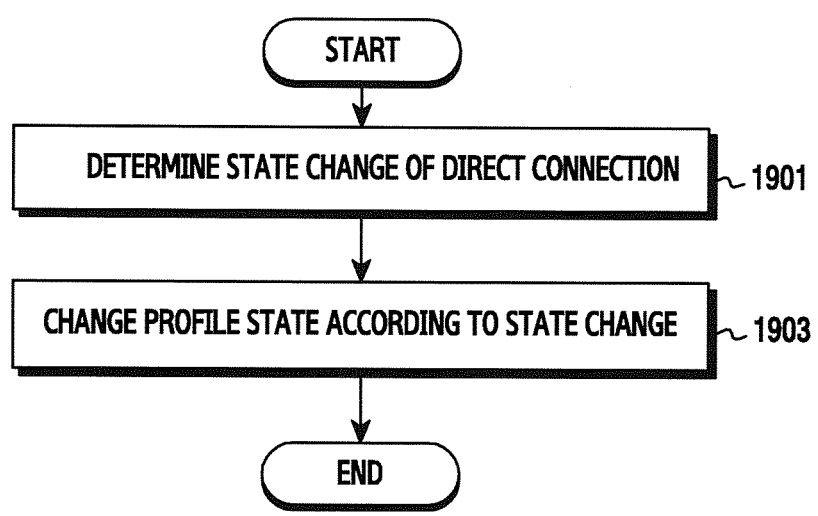
FIG. 19 illustrates operations of a user device in a wireless communication system according to another embodiment of the present disclosure.

FIG. 19 illustrates operations of a user device in a wireless communication system according to another embodiment of the present disclosure. FIG. 19 depicts a method for enabling/disabling a profile according to a direct connection state with another device having the same subscriber identification number, in the user device.

Referring to FIG. 19, the device determines state change of the direct connection in operation 1901. For example, the device determines whether the direct connection is established or released. The direct connection is a radio link established between the device and the other device without a third node therebetween, and can be established based on, for example, Bluetooth, wireless LAN, Zigbee, and the like. Herein, the direct connection can be established when the device enters a communication range of the other device or when the direct connection function of the device and the other device is activated. Alternatively, the direct connection can be released when the device leaves the communication range of the other device, when the device or the other device is turned off, or according to a user command.

In operation 1903, the device changes a profile state of the device corresponding to the direct connection state change. That is, the device controls the state of the profile including the same subscriber identification number as a subscriber identification number (e.g., MSISDN) assigned to the other device according to the direct connection state change. Herein, the profile state includes the enabled state and the disabled state. For example, when the direct connection is released, the device can switch the profile from the disabled state to the enabled state. More specifically, the device can enable the profile by itself, trigger the profile management server to enable the profile, or enable the profile under control of the other device. Hence, the device can access a cellular network. Further, the device can request to disable the profile of the other device. Before changing the profile state, the device can inquire of the user about whether to enable the profile. For example, when the direct connection is newly established, the device can switch the profile from the enabled state to the disabled state. In addition, the device can request to enable the profile of the other device. More specifically, the device can trigger the profile management server to enable the profile of the other device, or directly request the other device to enable the profile. Before changing the profile state, the device can inquire of the user about whether to disable the profile.

In FIG. 19, the device controls the profile state based on the direct connection state with another device. According to yet another embodiment of the present disclosure, the profile state can be controlled on a different condition. For example the profile state can be controlled based on a power state of the device. Specifically, when the profile is enabled and the user inputs a power off command, the device can control to disable a profile of the device and to enable the profile of the other device. For example, the device can send an enabling triggering message of the profile of another device, to the profile management server of the other device.

Figure 20:
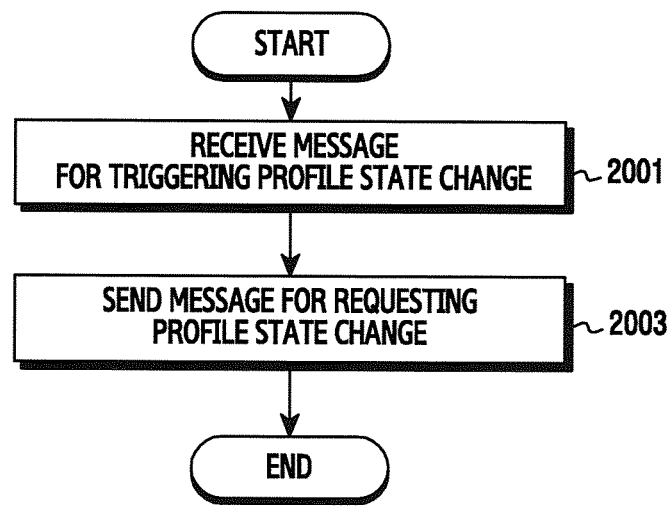
FIG. 20 illustrates operations of a server for managing a subscriber profile in a wireless communication system according to another embodiment of the present disclosure.

FIG. 20 illustrates operations of a server for managing a subscriber profile in a wireless communication system according to another embodiment of the present disclosure. FIG. 20 depicts a method for commanding to change a profile state according to triggering from a user device, in the server. For example, the server can be an SM-SR server.

Referring to FIG. 20, the server receives a message for triggering the profile state change in operation 2001. For example, the message, from one of user devices using the same subscriber identification number (e.g., MSISDN), can request to trigger the state change of the profile installed on the one device or another device. Herein, the profile state includes the enabled state and the disabled state. The triggering message can request to enable or to disable the profile. The triggering message can be received from a user device using a temporary profile installed on a subscriber information module (e.g., an eUICC) of the user device. In so doing, the profile requested to change the state according to the triggering message can be the device or the other device sending the message. That is, the triggering message can include at least one of a current state of a corresponding profile, a change state of the corresponding profile, and identification information of a device or a subscriber information module having the corresponding profile.

In operation 2003, the server sends a message requesting the profile state change. That is, in response to the triggering message, the server sends the message requesting to change the profile state, to the device indicated by the triggering message. In so doing, the message requesting the profile state change can be transmitted to a user device sending the triggering message, or other device. The message requesting the profile state change can include at least one of the current state of the corresponding profile, the change state of the corresponding profile, and the identification information of the device or the subscriber information module having the corresponding profile. The server can update state information of the profile.

Figure 21:
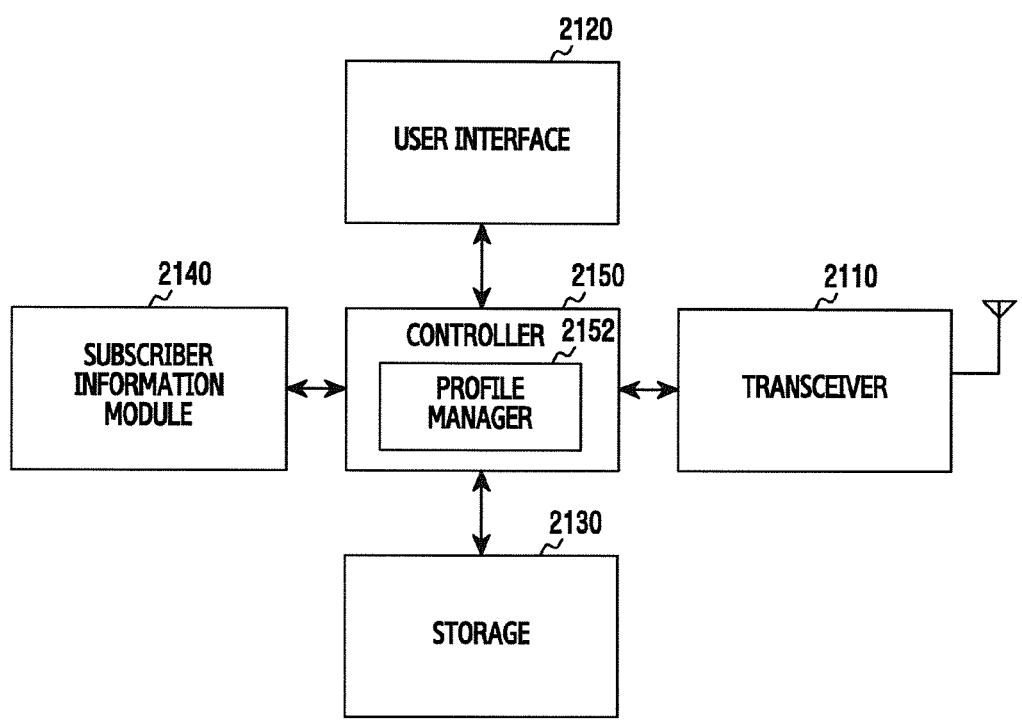
FIG. 21 illustrates a user device in a wireless communication system according to an embodiment of the present disclosure.

FIG. 21 is a block diagram of a user device in a wireless communication system according to an embodiment of the present disclosure. FIG. 21 depicts the device B 120 of FIG. 1, the device B 320 of FIG. 3, the device B 420 of FIG. 4, the device B 720 of FIG. 7, the device B 820 of FIG. 8, the device B 1020 of FIG. 10, the device B 1220 of FIG. 12, the device B 1520 of FIG. 15, and the device B 1720 of FIG. 17.

Referring to FIG. 21, the user device includes a transceiver 2110, a user interface 2120, a storage 2130, a subscriber information (SIM) module 2140, and a controller 2150.

The transceiver 2110 sends and receives signals over a radio channel using signal band conversion and amplification. That is, the transceiver 2110 generates a baseband signal using encoding and modulation, up-converts the baseband signal to a radio frequency (RF) band signal, and then sends the RF signal over an antenna. The transceiver 2110 down-converts an RF signal received over the antenna to a baseband signal, and demodulates and decodes the baseband signal. For example, the transceiver 2110 can include a transmit filter, a receive filter, an amplifier, a mixer, an oscillator, a digital to analog converter (DAC), and an analog to digital converter (ADC).

To support a plurality of different communication techniques, the transceiver 2110 can include a plurality of sub-transceivers. The sub-transceivers each can include a protocol stack of the corresponding communication technique. For example, the different communication techniques can include wireless LAN, Bluetooth, Zigbee, and a cellular network (e.g., long term evolution (LTE)). The different frequency bands can include super high frequency (SHF) band (e.g., 2.5 GHz, 5 GHz) and millimeter (mm) wave band (e.g., 60 GHz). The transceiver 2110 can include a separate RF chain for processing a frequency band signal corresponding to each communication technique. The transceiver 2110 sends and receives signals as stated above. Hence, the transceiver 2110 can be referred to as a transmitter, a receiver, or a transceiver.

The user interface 2120 outputs information and detects an input of the user. The user interface 2120 can forward a command or data input from the user to the controller 2150. For doing so, the user interface 2120 can include at least one hardware element for the outputting and the inputting. For example, the hardware can include at least one of a sensor, a keyboard, a keypad, a speaker, a microphone, a touch screen, a liquid crystal display (LCD), a light emitting diode (LED), a light emitting polymer display (LPD), an organic light emitting diode (OLED), an active matrix organic light emitting diode (AMOLED), and a flexible LED (FLED). For example, the user interface 2120 can provide data of user touch input through the touch screen, to the controller 2150. In particular, the user interface 2120 can display the screen inquiring of the user about whether to change the operation mode (e.g., the cellular connection mode, the direct connection mode). The operation mode change is related to enabling/disabling the profile stored in the subscriber information module 2140. The user interface 2120 can include a display means and thus be referred to as a display.

The storage 2130 stores a basic program for the operations of the user device, an application program, and data such as setting information. In particular, the storage 2130 can store a program for controlling the state of the profile stored in the subscriber information module 2140 according to the direct connection state with another device.

The subscriber information module 2140 is a component recording authentication information required to access the cellular network, and subscriber information. For example, the subscriber information module 2140 can be referred to as a SIM, a UICC, an eUICC, and so on. The subscriber information module 2140 can include software objects for providing at least one profile, an operating system, key information, and a radio channel. For example, the subscriber information module 2140 can be constructed as shown in FIG. 2. The subscriber information module 2140 can provide the subscriber information according to a request of the controller 2150 or the transceiver 2110. The subscriber identification module 2140 can enable/disable at least one profile according to a command of the controller 2150.

The controller 2150 controls the operations of the user devices. For example, the controller 2150 sends and receives the signals through the transceiver 2110. The controller 2150 executes the program stored in the storage 2130, and records and reads data to and from the storage 2130. For doing so, the controller 2150 can include at least one processor. For example, the controller 2150 can include an application processor (AP) for controlling a high layer such as an application program. The controller 2150 includes a profile manager 2152 for controlling the state of the profile stored in the subscriber information module 2140. When the profile stored in the subscriber information module 2140 is enabled, the controller 2150 can control to access the cellular network using the information contained in the profile. The controller 2150 can control the user device to serve as the device B 320 of FIG. 3, the device B 420 of FIG. 4, the device B 720 of FIG. 7, the device B 820 of FIG. 8, the device B 1020 of FIG. 10, the device B 1220 of FIG. 12, the device B 1520 of FIG. 15, or the device B 1720 of FIG. 17, or to conduct the method of FIG. 6, FIG. 11, FIG. 14, FIG. 16, FIG. 18, or FIG. 19. More specifically, the controller 2150 operates as follows.

According to an embodiment of the present disclosure, the controller 2150 receives the profile including the same subscriber identification number as the subscriber identification number of another device through the transceiver 2110. The profile can be received from the SM-SR server corresponding to the subscriber information module 2140, using the temporary profile installed at the manufacturing of the subscriber information module 2140. The controller 2150 installs the profile in the subscriber information module 2140. Next, the controller 2150 may not immediately enable the profile. For example, the controller 2150 can determine whether to enable the installed profile based on the profile state of the other device.

According to an embodiment of the present disclosure, the controller 2150 can check the state change of the direct connection with another device, and control the profile state stored in the subscriber information module 2140 in response to the state change of the direct connection. That is, the controller 2150 controls the state of the profile including the same subscriber identification number as the subscriber identification (e.g., MSISDN) assigned to the other device, according to the state change of the direct connection. Herein, the direct connection can be established when the device enters a communication range of the other device or when the direct connection function of the device and the other device is activated. Alternatively, the direct connection can be released when the device leaves the communication range of the other device, when the device or the other device is turned off, or according to the user command.

For example, when the direct connection is released, the controller 2150 can switch the profile from the disabled state to the enabled state. More specifically, the controller 2150 can enable the profile by itself, trigger the profile management server to enable the profile, or enable the profile under the control of the other device. Further, the controller 2150 can request to disable the profile of the other device. Before changing the profile state, the controller 2150 can inquire of the user about whether to enable the profile through the user interface 2120.

For example, when the direct connection is newly established, the controller 2150 can switch the profile from the enabled state to the disabled state. In addition, the controller 2150 can request to enable the profile of the other device through the communication device 2110. More specifically, the controller 2150 can trigger the profile management server to enable the profile of the other device, or directly request the other device to enable the profile. Before changing the profile state, the controller 2150 can inquire of the user about whether to disable the profile through the user interface 2120.

When the profile is enabled and the power off command is input through the user interface 2120, the controller 2150 can control to enable the profile of the other device. For example, the controller 2150 can send the enabling triggering message of the profile of the other device to the profile management server of the other device through the transceiver 2110.

Figure 22:
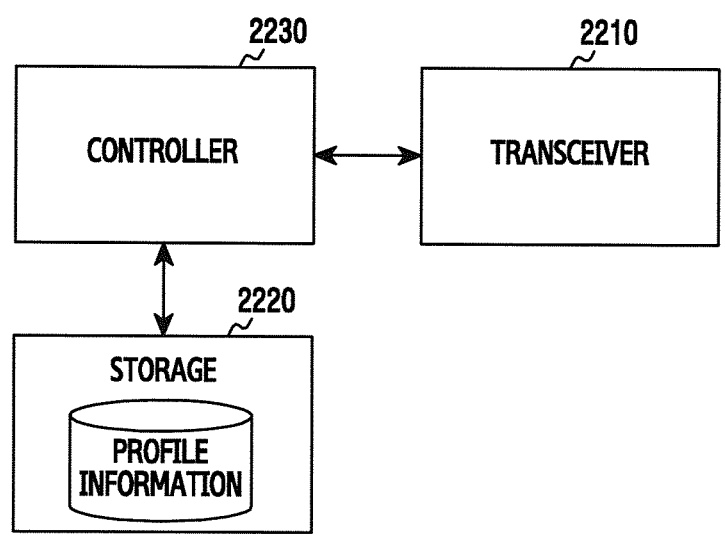
FIG. 22 illustrates a server for managing a subscriber profile in a wireless communication system according to an embodiment of the present disclosure.

FIG. 22 is a block diagram of a server for managing a subscriber profile in a wireless communication system according to an embodiment of the present disclosure. FIG. 22 depicts the SM-SR server 390 of FIG. 3, the SM-SR server 490 of FIG. 4, the SM-SR server 790 of FIG. 7, the SM-SR server 890 of FIG. 8, the SM-SR server 1290 of FIG. 12, the SM-SR server 1590 of FIG. 15, and the SM-SR server 1790 of FIG. 17.

Referring to FIG. 22, the server includes a transceiver 2210, a storage 2220, and a controller 2230.

The transceiver 2210 provides the server with the function for communicating with another device. That is, the transceiver 2210 converts a bit string to send from the server to other node, to a physical signal, and converts a physical signal received from the other node to a bit string. That is, the transceiver 2210 can send and receive signals. Hence, the transceiver 2210 can be referred to as a transmitter and a receiver.

The storage 2220 stores a basic program for the operations of the server, an application program, and data such as setting information. In particular, the storage 2220 can store information of profiles for at least one user device.

The controller 2230 controls the operations of the server. For example, the controller 2230 sends and receives the signals through the transceiver 2210. The controller 2230 executes the program stored in the storage 2220, and records and reads data to and from the storage 2220. For doing so, the controller 2230 can include at least one processor. The controller 2230 can provide the profile to the user device and request the profile state change in response to the triggering from the user device. For example, the controller 2230 can control the server to function as the SM-SR server 390 of FIG. 3, the SM-SR server 490 of FIG. 4, the SM-SR server 790 of FIG. 7, the SM-SR server 890 of FIG. 8, the SM-SR server 1290 of FIG. 12, the SM-SR server 1590 of FIG. 15, or the SM-SR server 1790 of FIG. 17, and to conduct the method of FIG. 22. More specifically, the controller 2230 operates as follows.

According to an embodiment of the present disclosure, the controller 2230 receives the message for triggering the profile state change from the user device through the transceiver 2210. For example, the message can be received from one of user devices using the same subscriber identification number (e.g., MSISDN). The triggering message can be received using the temporary profile installed in the subscriber information module of the user device. The profile requested by the triggering message to change the state can be the device sending the message or other device. Hence, the controller 2230 sends the message requesting the profile state change through the transceiver 2210. The message requesting the profile state change can be transmitted to the user device sending the triggering message or other device. The triggering message and the message requesting the profile state change can include at least one of the current state of the corresponding profile, the change state of the corresponding profile, and the identification information of the device or the subscriber information module including the corresponding profile. A plurality of devices can be managed with a single number by assigning the same subscriber identification number to the devices in a wireless communication system.

The methods described in the claims or the specification of the present disclosure can be implemented using hardware and software alone or in combination.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a first device in a wireless communication system, the method comprising:
    transmitting, to a server, a first message for triggering enablement of a first profile, upon determining that a communication link between the first device and a second device is disconnected;
    receiving, from the server, a second message for enabling the first profile in the first device, in response to the first message; and
    enabling the first profile, in response to the second message, wherein the first profile comprises subscriber information that is used to access to a mobile communication network.

2. The method of claim 1, wherein enabling the first profile comprises:
    displaying a screen inquiring whether to enable the first profile in the first device; and
    detecting a user input for enabling the first profile in the first device.

3. The method of claim 1,
    wherein the first profile comprises a subscriber identification number that is the same as a subscriber identification number assigned to the second device.

4. The method of claim 1, further comprising transmitting, to the second device, a third message for disabling a second profile comprising a subscriber identification number that is the same as a subscriber identification number of the first profile, in the second device, upon detecting a user input to release the communication link between the first device and the second device.

5. The method of claim 1, further comprising:
    establishing a communication link between the first device and the second device; and
    disabling the first profile in the first device, in response to the establishment of the communication link.

6. The method of claim 5, further comprising transmitting, to the second device, a fourth message for enabling a second profile comprising a subscriber identification number that is the same as a subscriber identification number of the first profile, in the second device, in response to the establishment of the communication link.

7. The method of claim 1, further comprising transmitting, to the server, a message for enabling a second profile comprising a subscriber identification number that is the same as a subscriber identification number of the first profile, in the second device, upon detecting a power off command input in the first device.

8. The method of claim 1, further comprising:
    receiving, from the server, the first profile comprising a subscriber identification number that is the same as a subscriber identification number assigned to the second device; and
    installing the first profile in the first device.

9. A method for operating a server in a wireless communication system, the method comprising:
    receiving, from a first device, a first message for triggering enablement of a first profile; and
    transmitting, to the first device, a second message for enabling the first profile in the first device, in response to the first message,
    wherein the first profile comprises subscriber information that is used to access to a mobile communication network, and
    wherein the first message is received in response to disconnection of a communication link between the first device and a second device.

10. The method of claim 9, further comprising:
    transmitting, to the second device, a third message for disabling a second profile comprising a subscriber identification number that is the same as a subscriber identification number of the first profile, in the second device, in response to the first message; and
    updating state information of the first and second profiles.

11. An apparatus of a first device in a wireless communication system, the apparatus comprising:
    a subscriber information module configured to store a first profile;
    a transceiver configured to
        transmit, to a server, a first message for triggering enablement of the first profile, upon determining that a communication link between the first device and a second device is disconnected, and
        receive, from the server, a second message for enabling the first profile in the first device, in response to the first message; and
    a controller configured to enable the first profile, in response to the second message,
    wherein the first profile comprises subscriber information that is used to access to a mobile communication network.

12. The apparatus of claim 11, further comprising a display configured to display a screen inquiring whether to enable the first profile in the first device, wherein the controller is further configured to detect a user input for enabling the first profile in the first device.

13. The apparatus of claim 11, wherein the first profile comprises a subscriber identification number that is the same as a subscriber identification number assigned to the second device.

14. The apparatus of claim 11, wherein the transceiver is further configured to transmit, to the second device, a third message for disabling a second profile comprising a subscriber identification number that is the same as a subscriber identification number of the first profile, in the second device, upon detecting a user input to release the communication link between the first device and the second device.

15. The apparatus of claim 11, wherein the controller is further configured to:

establish a communication link between the first device and the second device, and disable the first profile in the first device, in response to a result of the establishment of the communication link.

16. The apparatus of claim 15, wherein the transceiver is further configured to transmit, to the second device, a fourth message for enabling a second profile comprising a subscriber identification number that is the same as a subscriber identification number of the first profile, in the second device, in response to a result of the establishment of the communication link.

17. The apparatus of claim 11, wherein the transceiver is further configured to transmit, to the server, a message for enabling a second profile comprising a subscriber identification number that is the same as a subscriber identification number of the first profile, in the second device, upon detecting a power off command input in the first device.

18. The apparatus of claim 11, wherein the transceiver configured to receive, from the server, the first profile comprising a subscriber identification number that is the same as a subscriber identification number assigned to the second device, and wherein the controller is configured to install the first profile in the subscriber information module.

19. An apparatus of a server in a wireless communication system, the apparatus comprising:

a transceiver configured to receive, from a first device, a first message for triggering enablement of a first profile; and the transceiver configured to transmit, to the first device, a second message for enabling the first profile in the first device, in response to the first message, wherein the first profile comprises subscriber information that is used to access to a mobile communication network, and wherein the first message is received in response to disconnection of a communication link between the first device and a second device.

20. The apparatus of claim 19, further comprising a controller, wherein the transceiver is further configured to transmit, to the second device, a third message for disabling a second profile comprising a subscriber identification number that is the same as a subscriber identification number of the first profile, in the second device, in response to the first message, and wherein the controller is configured to update state information of the first and second profiles.

* * * * *